United States Patent
Bartlett et al.

(10) Patent No.: US 6,263,382 B1
(45) Date of Patent: *Jul. 17, 2001

(54) SIZER FOR INTERACTIVE COMPUTER SYSTEM CONFIGURATION

(75) Inventors: Charles A. Bartlett, Woodlands; Manoj J. Varghese, Cypress; Christoph Schmitz, Tomball; Keith L. Kelley, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,022

(22) Filed: Jul. 29, 1998

(51) Int. Cl.[7] .................................................. G06F 9/00
(52) U.S. Cl. ................... 710/10; 709/220; 213/1
(58) Field of Search ............................. 709/220; 710/10; 713/1

(56) References Cited

U.S. PATENT DOCUMENTS

| | | | |
|---|---|---|---|
| 5,428,791 | 6/1995 | Andrew et al. | 395/700 |
| 5,452,415 * | 9/1995 | Hotka | 345/329 |
| 5,515,524 | 5/1996 | Lynch et al. | 395/500 |
| 5,546,595 * | 8/1996 | Norman et al. | 710/10 |
| 5,640,598 * | 6/1997 | Baugher et al. | 710/10 |
| 5,651,133 | 7/1997 | Burkes et al. | 395/441 |
| 5,668,995 | 9/1997 | Bhat | 395/674 |
| 5,687,334 | 11/1997 | Davis et al. | 395/339 |
| 5,708,769 * | 1/1998 | Stallmo | 714/6 |
| 5,740,436 | 4/1998 | Davis et al. | 395/651 |
| 5,787,246 * | 7/1998 | Lichtman et al. | 709/220 |
| 5,819,042 * | 10/1998 | Hansen | 709/222 |
| 5,825,361 * | 10/1998 | Rubin et al. | 345/349 |
| 5,838,907 * | 11/1998 | Hansen | 709/220 |
| 5,850,539 | 12/1998 | Cook et al. | 395/500 |
| 5,951,687 * | 9/1999 | Chan et al. | 713/2 |

OTHER PUBLICATIONS

Bonnie Carter et al., "Oracle System Sizer[198] Getting Started for Compaq Windows NT Systems, Rel. 2.3.1," 1996, pp. 1:2–1:5.

* cited by examiner

*Primary Examiner*—Thomas Lee
*Assistant Examiner*—Nguyêñ Nguyên
(74) *Attorney, Agent, or Firm*—Akin, Gump, Strauss, Hauer & Feld, LLP

(57) ABSTRACT

A computer system is implemented according to the invention when an computer process interactively allows a user to configure a computer system. The device according to the present invention abstracts functionality common to all application specific computer configuration problems and locates it in a single framework. In this way, multiple application specific configuration processes can be developed easily without duplicating the work of creating common features.

28 Claims, 30 Drawing Sheets

SIZER FOR INTERACTIVE COMPUTER SYSTEM CONFIGURATION

CROSS-REFERENCE TO RELATED APPLICATIONS

This application is related to the following copending, concurrently filed, and commonly assigned United States patent applications which are hereby incorporated by reference:

U.S. patent application Ser. No. 09/126,023, entitled "METHOD FOR DESCRIBING AND STORING DESCRIPTIONS OF HIERARCHICAL STRUCTURES" to Christoph Schmitz, Keith L. Kelley, Charles A. Bartlett, Manoj J. Varghese;

U.S. patent application Ser. No. 09/126,025, entitled "METHOD OF DEVELOPING PHYSICAL REQUIREMENTS FOR COMPUTER CONFIGURATION" to Christoph Schmitz, Keith L. Kelley, Charles A. Bartlett, Manoj J. Varghese; and U.S. patent application Ser. No. 09/126,024, entitled "PRICE/PERFORMANCE BASED COMPUTER CONFIGURATION" to Christoph Schmitz, Keith L. Kelley, Charles A. Bartlett, Manoj J. Varghese.

BACKGROUND OF THE INVENTION

1. Field of the Invention

The present invention relates generally to a computer configuration device and, more particularly, to a tool for enabling a user to determine an optimal computer configuration depending upon the user's specific applications.

2. Description of the Related Art

The original computers were very complex devices that required skilled technicians and scientists to operate. When a new device, such as a printer, was added to the computer, special software and hardware needed to be developed specifically for the new device. With the advent of personal computers, it became impractical to require users to develop new software and hardware whenever new hardware was added.

Computer components eventually became standardized, and one of the important pieces of the puzzle was the Disk Operating System, or DOS. Originally DOS only supported a small number of devices such as printers, floppy drives, and hard disk drives. In addition, DOS was severely limited in the number of different computer configurations and components such as memory and peripherals that could be supported.

One advance in the computer arts was the arrival of "plug-and-play" architecture. Plug-and play means that a device can be added to a system without significant setup. This and other tools were the result of the standardization of interfaces which enables many devices to be easily configured to work together.

Today, the typical consumer and business user is presented with an astonishing number of choices with respect to the configuration of a new computer. A computer can be tailored to the particular needs of every user, from a multinational corporation with immense database requirements to an individual who only desires to log into the Internet. There are computers specialized to perform such tasks as bulk memory storage, communications, and game playing. Depending upon a user's needs, a computer can be configured with anywhere from 16 megabytes to hundreds of megabytes of random access memory (RAM). Static storage such as hard disk drives can vary in capacity from gigabytes ($10^9$ bytes) to terabytes ($10^{12}$ bytes) of data, each arranged in any one of a large number of configurations. Large amounts of RAM and static storage, however, cost proportionally more money. As a result, there is usually a tradeoff between price and performance.

The number of possible devices that can be added to any particular system has also grown. Computers now routinely come with devices that were unavailable even a few decades ago, such as speakers, CD-ROM drives, and fax modems. In addition, a user can add a large number of additional components such as tape drives, network cards, and specialized, game playing devices such as a joy stick. The number of possible choices for a computer system configuration is multiplied by the number of manufacturers that produce each component producing perhaps millions of possible systems.

SUMMARY OF THE INVENTION

Using a device implemented according to the invention, a framework for a computer system configuration device ("framework") provides a user interface and functionality common to a number of computer system configuration devices ("sizers") that are tailored for specific applications. A sizer collects user data requirements, navigates through possible computer hardware configurations, estimates performance of specific configurations, and provides a recommended configuration to the framework for presentation to an end-user.

The sizer will typically execute in the Windows 95 and Windows NT native environment and is extendible to other environments such as SCO UNIX. The framework architecture can also be extended to support web hosted clients. The framework also supports sizers for multiple operating systems, which means that, even though the sizer is typically implemented on Windows 95 or Windows NT, it could be run in other environments such as SCO UNIX or any such variant. The framework supports multiple product sizers, all of which may be executed serially. The framework can be extended to sizing multiple products on a single server.

A framework can support registration of sizers on the fly, allowing them to provide their credentials, authenticate their identity, and register in the framework's sizer registry. The framework provides front end-user interface management services like navigation, report generation, as well as middle level services like hardware configuration and constrint management. In addition, the framework provides back end services like data persistence. In short, the framework abstracts common sizer functionality and allows for creating a product sizer with minimal effort.

More specifically, the framework preferably supports a plug and play architecture, in essence allowing individual sizers to be plugged into the framework easily. The framework allows sizers to be dynamically attached to the framework through a "registration" mechanism. To add a sizer to the framework, a "Open file" like dialog is presented and selecting a sizer effectively sends a request to the framework for registration. To accomplish this the framework requests identification and resource requirements from the individual sizers, and the sizers provide the relevant information. The framework fills its main panel of information about the sizers characteristics by issuing a series of queries, in effect making calls to known entry points in the sizers' dynamic linked libraries (DLL).

The framework provides user interface management services providing a common look and feel for all sizers supported by it. The framework provides navigation services that allow for navigating between pages. This means that the framework is responsible for navigating among screens generated by the framework, a sizer, and possibly multiple sizers. The same set of facilities is provided for any "utility," such as a data management utility, that is tacked onto the framework.

The framework can support launching secondary utilities by calling single entry point DLL's. This is the preferred way of calling utilities, to obviate the need to manage secondary window creations when making system calls. If the secondary utility requires a windowing interface, then it will export entry points identical to the product sizer's. Utilities to store and maintain sizer data tables, specifically server configurations and data models, are provided.

The framework also has a dialog that presents information about sizer characteristics, availability choices for individual sizers, and server recommendations. A sizer dialog is typically sandwiched between framework dialogs.

The framework generates user-requested reports specific to system recommendations and attendant workload characteristics specified by the user. The framework also, upon request, prints the reports.

The framework supports multiple levels of availability. Availability is a level of acceptable continual access in the ultimately configured system's data and resources. Availability considerations invariably affect the performance and configuration of every solution. Two factors that affect availability, performance, and possible configuration solutions are fault tolerance and a server recovery. Fault tolerance addresses the effects of single disk failures or, in other words, how much time is required to recover from a failure and how much work is lost as a result of a failure.

The information on which processors can be recommended by a sizer is extracted from the sizer by the framework and a subset of the processors is communicated to the user. The framework will support all relevant processor subsystems known at the time of release, however an individual sizer may choose to support only a subset of the available processors. The framework will need to know of the supported subset so that it may present it to the user as well as for doing configuration constraint management.

The processor subsystem is composed of the architecture or server type, the processor, and the processor quantity. There can be many processor subsystems defined for a server, but for sizing purposes, a server roughly corresponds to a processor architecture.

Using the workload specification and availability selections, a set of recommended hardware components is determined and presented to the user. The recommended components can include, but are not limited to, the server processor selections, the number of processors recommended, the recommended memory, the network interface card (NIC), and the recommended disk quantities and capacities. Recommendations may include disks with varying capacities. The recommended hardware components are configurable into a valid solution; for instance, a server that supports the processor selection also supports the recommended memory and quantity of disk drives.

The framework exposes to the sizer a mechanism to extract information about individual processor subsystems and, based on the information, lets the sizer "select," by way of a public protocol (public methods) the processor, number of processors, amount of RAM, drives, and controllers, and disk array information. The framework maintains a list of available processor subsystems and attributes and allows the sizer to "page" through the available systems to find the best fit.

The "selected" configuration, which includes processor, processor speed, cache size, number of processors, controllers, and disk array information is communicated to the user. The disk array information includes: the description of the array contents (provided by the sizer), the recommended drive capacity and number of drives, and whether the drives have to be added in pairs as in a RAID 1 architecture. The framework, based upon the information provided by the product sizer, recommends the drive capacity and quantity for each drive, the number of drives recommended to support the I/O load, and the storage required for each. The RAID level is displayed and/or reported. The framework also computes and displays a relative price for the completed configuration.

BRIEF DESCRIPTION OF THE DRAWINGS

FIGS. 5–21 are the display screens of a one embodiment of a sizer;

DETAILED DESCRIPTION OF INVENTION

Figure 1:
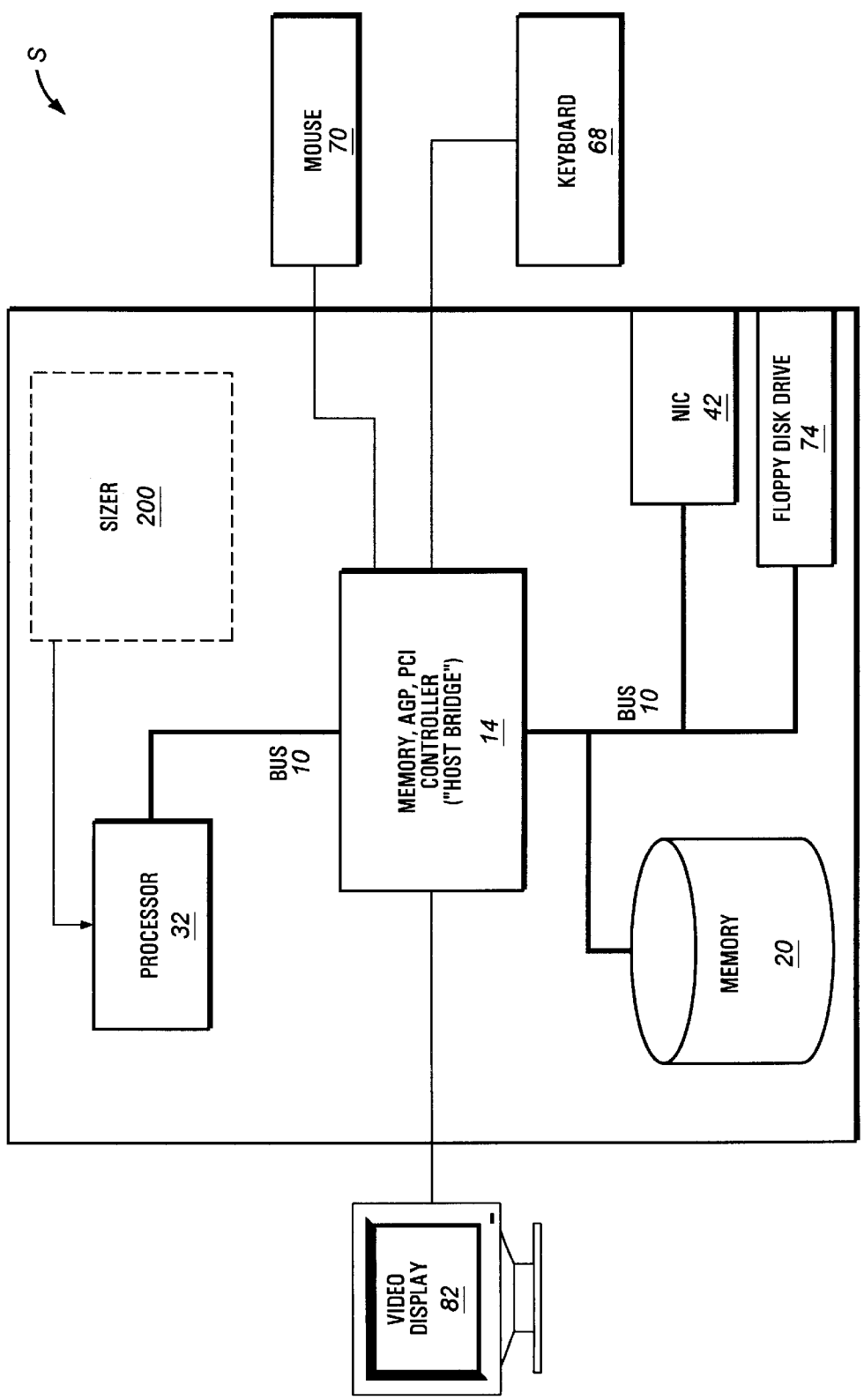
FIG. 1 is a block diagram of a computer system capable of being programmed in accordance with the present invention.

Turning to FIG. 1, illustrated is a typical computer system S in which the sizer according to the invention can be run. The computer system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 32 and a memory subsystem 20.

The host bridge 14 in the disclosed embodiment is a 440LX Integrated Circuit by Intel Corporation, also known as the PCI AGP Controller (PAC). The processor 32 is preferably a Pentium II. The processor 32 could be replaced with a different processor other than the Pentium II without detracting from the spirit of the invention.

The PCI bus 10 couples a variety of devices that generally take advantage of a high speed data path. This includes a network interface controller (NIC) 42, which preferably supports the ThunderLan™ power management specification by Texas Instruments, and a floppy disk drive 74. The floppy disk drive 74 preferably would be a 3½" floppy disk. A video display 82, a mouse 70, and a keyboard 68 can also be coupled to the host bridge 14, enabling interaction with the computer system S.

Finally, a sizer application 200 (see FIG. 3) would run on the processor 32 and utilize the other devices of computer system S. The computer system S illustrates only one platform in which the size according to the present invention can be run.

The Target System Configuration

Figure 2:
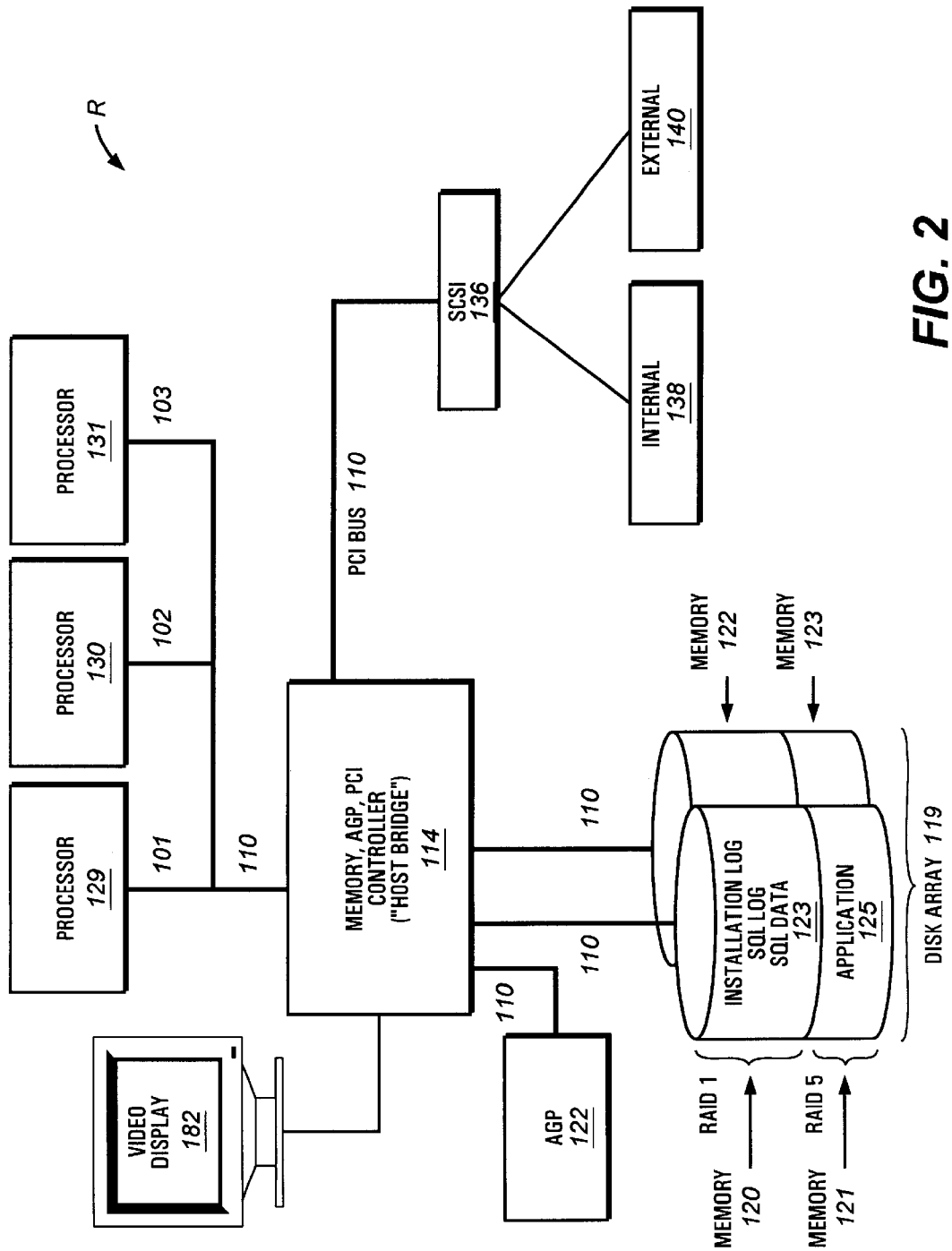
FIG. 2 is a block diagram of a computer system capable of being configured by means of present invention.

Turning to FIG. 2, illustrated is a typical computer system R capable of being "sized" by a sizer according to the invention. The computer system R contains multiple processors 129, 130, and 131. The processors 129, 130, and 131 are each connected to their own host buses 101, 102, and 103 respectively, which in turn connect to a PCI bus 110. The PCI bus 110 is controlled by PCI controller circuitry located within a memory/accelerated graphics port (AGP)/PCI controller 114. This controller 114 (the "host bridge") couples also the PCI bus 110 to four memory subsystems 120–123. The PCI bus 110 couples a variety of devices that generally take advantage of a high speed data path. This includes a small computer system interface (SCSI) controller 136, with both an internal port 138 and an external port 140. In addition, a video display 182 can be coupled PCI controller 114 for display of data by the computer system R.

There is a relatively loose connection between the computer system R and the memory subsystems 120–123. The major constraint includes the number of controllers 114 which can be installed in the computer system R. In one embodiment, this information is maintained by a sizer framework 206 from information retrieved from hardware description files 208–214 (see FIG. 3). This information may contain additional data such as a user-defined PCI slot reservation for non-performance related expansions such as NICs or a Remote Insight Board.

The sizer 200 (see FIG. 3) considers capacity and performance requirements when configuring the storage subsystem. In one embodiment, four distinct data areas are configured by the sizer:

| | |
|---|---|
| Installation Area | The operating system and the server's primary application are installed in this area. In a properly tuned system, the number of I/Os performed is insignificant during steady state. Since this area includes a paging file, it is typically configured with RAID 1 fault tolerance for maximun performance. |
| Database Data (not shown) | The server's primary application's data is stored in this area. In an application such as OLTP by Microsoft, I/Os are completely random 2K reads and writes. This data area may be configured with either RAID 1 or RAID 5 fault tolerance. |
| Database Log (not shown) | If the server's primary application is a database, a transaction log may be stored in this area. This is a heavy sequential write data area; it is typically configured with RAID 1 fault tolerance for maximum performance. The installation area and database log are typically stored on the same physical drive array. |
| Application Data | Any other data on the server is considered application data. This may include backups, data for loading, data from extracts, etc. The perfomance requirements of this data area are ignored by the sizer. This data area is typically configured with RAID 5 fault tolerance for maximum storage efficiency. |

The following is a list of some basic terminology:

| | |
|---|---|
| Association | A relationship between exactly 2 classes which can cover a wide range of interactions. |
| Attribute | A member variable of a Class. Attributes store information about the class. |
| Class | The basic object within the OMT method. Classes, their attributes and operations, their properties, and their relationships to one another define the function of a subsystem. |
| Operation | A method of a class. Operations cover the spectrum of behavior for a class. |
| Generalization | A relationship between a single class and many classes that together represents different specializations of the single class by the many. The single class is called the |

| | |
|---|---|
| | parent and the many are called children. |
| Subsystem | A physical petitioning of classes and relationships within a system. Subsytems generally represent sub-groupings of objects that are logically connected to one another but generally separate from others. |
| Server Family | Defines a group of servers which address a specific market segment and generally share a system architecture. Examples include: ProSignia 300, ProLiant 5000. |
| Server | Identifies a processor type supported by a server family. There are typically many servers defined within a server family, and a server designation may also dictate differences among processor Level-2 cache or memory models. For example, a ProLiant 2500 6/166 is considered a different server from the ProLiant 500 6/200. Likewise, the ProLiant 5000 6/200 with 256KB of Level-2 cache are different servers. |
| Server Model | Hardware configurations that are offered for sale as a single item. A server model, represents the physical enclosures (tower or rack-mount), the server, the standard number of processors, the standard memory, the standard disk drives, the number and type of drive bays, and the standard SMART-2 controllers. |
| Architecture | Defines the internal architecture of a server that causes performance differences among servers which have the same type and quantity of processors. Examples include: ProLiant 4500 and ProLiant 5000. |
| Memory Module | Abstracts the physical memory upgrade paths. For instance, the ProLiant 2500 and 5000 both support four memory modules; the fact that the ProLiant 2500 has 4 memory slots which hold four single DIMM modules and the ProLiant 5000 has 16 memory slots which holds four modules containing four DIMMS each is not important to the sizer. |

The sizer 200 uses drive capacity and performance information to configure the storage subsystems 120–123. The sizer framework 206 maintains a list of available hard drives. The maximum and recommended I/O rates, which are specific to an application, may be maintained by the application sizer 202 or derived by the sizer 200 from basic performance information maintained by the sizer framework 206 (rpm and seek time). As in other subsystems, the sizer framework 206 supports increment/decrement operation and may constrain selections.

The sizer 202 utilizes the hard drive information to properly arrange the data areas into a set of drive arrays which are included in the recommendation provided to the sizer framework 206. Each drive array includes: the hard drive selected for the array, the number of drives in the array, the capacity configured for each of the RAID levels (0, 1, and 5), and a description of the drive array contents.

The sizer defines a set of disk models which configure the data areas into drive arrays. Each disk model assigns the RAID levels for the data areas and maps the data areas to the drive arrays. The appropriate hard drive selection and drive quantity is made based on hard drive capacity and performance information. Each disk model has a range of drive quantities that are appropriate for its use; some disk models may be rejected by the sizer 202 due to this constraint.

The computer system R illustrates only one platform which the system according to the present invention can configure. The disclosed techniques can, without distracting from the spirit of the invention, be implemented on any hierarchical structure, regardless of whether the structure contains less, additional, or different components than the system in FIG. 2. The device configured by means of the present invention does not need to be a computer, but might be a device such as a rack mounted, custom stereo system.

The Sizer Framework Configuration

Figure 3:
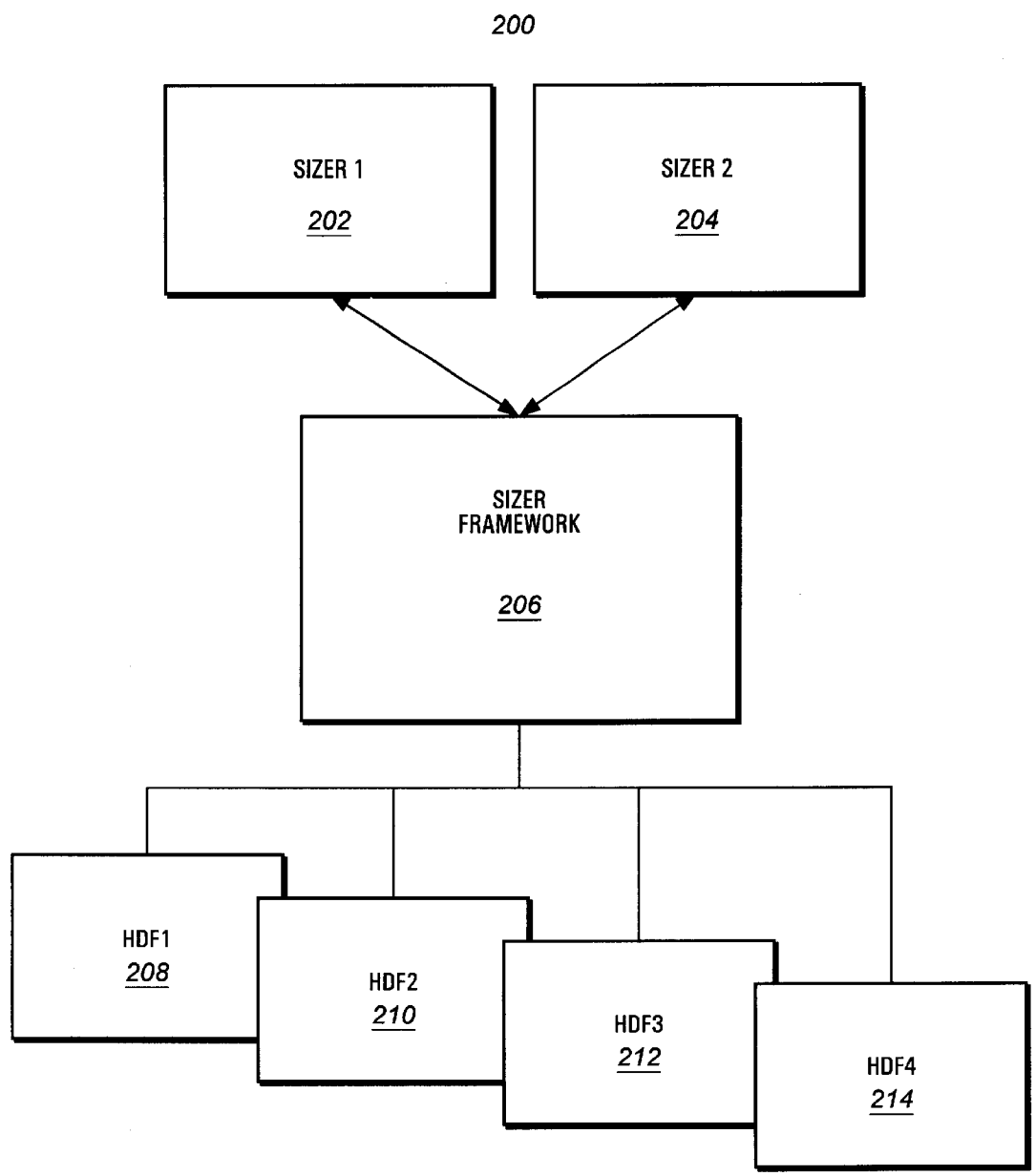
FIG. 3 is a block diagram of a computer system configuration program, or sizer, including application specific sizer modules, a sizer framework, and hardware definition files.

Turning now to FIG. 3, illustrated is a sizer, complete with application sizer modules 202 and 204, a sizer framework 206, and hardware description files (HDFs) 208–214. The application sizer modules 202 and 204 are designed individually for a specific application such as a computer designated as a Microsoft SQL server, a Microsoft NT server, or an Oracle database server. The sizer framework 206 contains the functionality common to current or future application sizers. This design enables a software developer to build an application sizer without the need of recreating or rewriting the common functionality such as the graphical user interface (GUI).

The HDFs 208–214 are read in by the sizer framework 206 and contain descriptions of all hardware available to be configured into a computer system. Examples of hardware that may be described in a HDF are memory chips, hard disks, network interface cards (NICs), memory controllers, and CD-ROM drives. The application sizer 202 or 204 may not need all the descriptions read into memory from the HDFs 208–241 but the sizer framework 206, not knowing what a specific application sizer 202 or 204 needs, reads in all that are available. The application sizers 202 and 204 have no direct connection with the HDFs 208–214, but instead rely on the sizer framework 206 for information on available hardware which the framework 206 has obtained from the HDFs 208–214.

The set of framework services can be viewed as being two tiered, the lower level contains the infrastructure services 420 while the upper layer support application features 408 like navigation 410 and report management 412 which are directly visible to the user.

Individual sizers 202 will be developed by deriving from a core set of frame work classes, and further specializing, member functions, or overriding functionality, already provided by the framework. The framework APIs 406 are the glue that enables all the components to work together. Specific infrastructure 420 functionality is exposed, to a sizer 202, via the APIs 406

Figure 4:
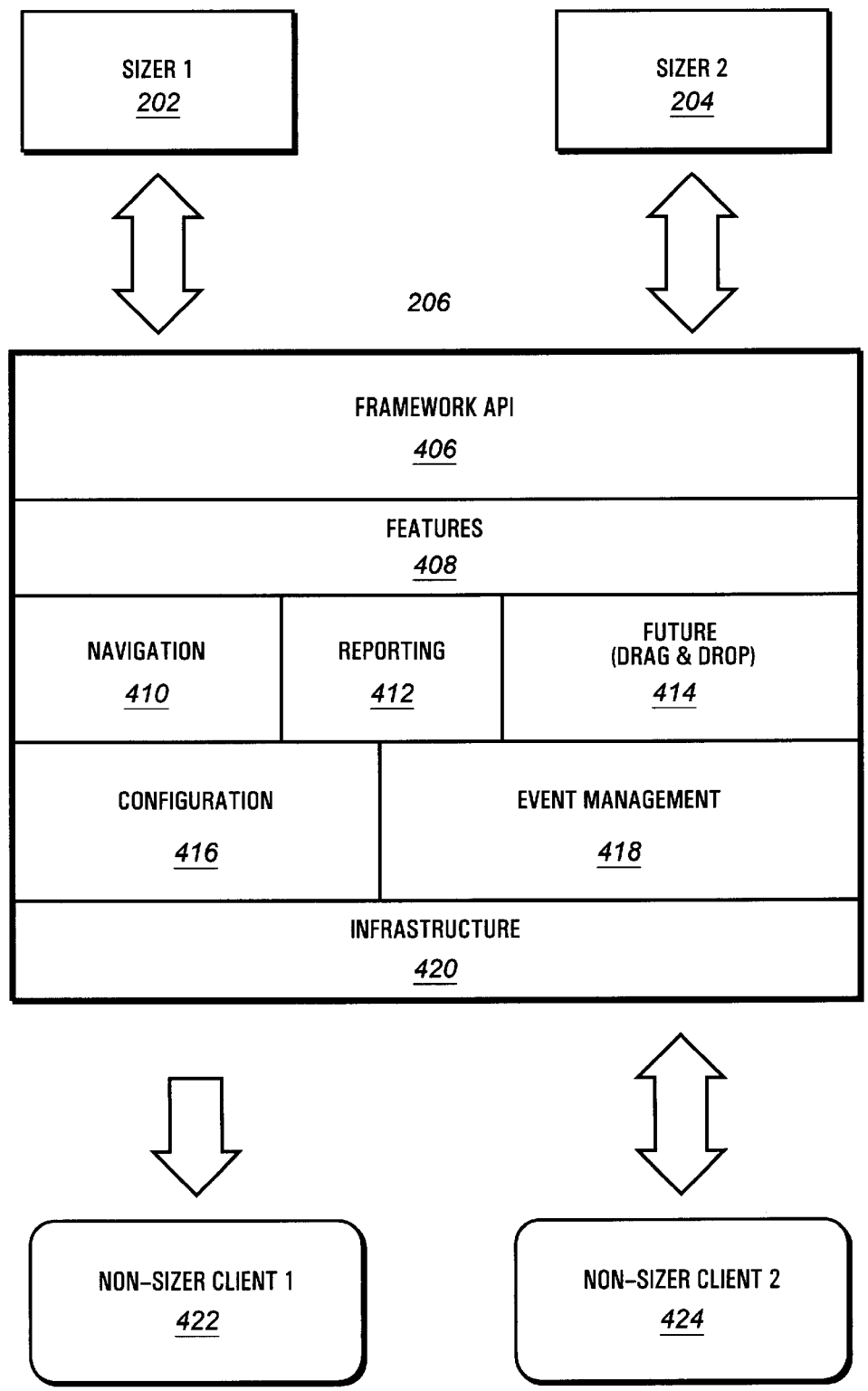
FIG. 4 is an illustration of a sizer framework.

Turning now to FIG. 4, illustrated is a more detailed description of the sizer framework 206. The application sizers 202 and 204 are illustrated only to show that there is an interchange of information between them and the sizer framework 206.

The point of contact for the application sizers 202 and 204 are the framework's application programming interfaces (APIs). The APIs consist of public functions that the sizers 202 and 204 can use to send or receive information or to make use of the sizer framework's 206 features 408. The features 408 include screen navigation 410 and reporting 412. Perhaps a feature that will be added in a future release of the sizer framework is drag and drop 414. The drag and drop feature 414 is the ability to click on an specific application sizer 202 icon displayed on the video display 82 with the mouse 70, drag the icon to the sizer framework 206 icon, and start the sizer program by enabling the sizer framework 206 to extract all the necessary information about the application sizer 202 from its file stored in memory 20. The three features, navigation 410, reporting 412, and drag and drop 414 are not an exhaustive list of features that can be provided within the sizer framework 206. As the need for new features common to application sizers becomes apparent, they will be added into the features layer 408.

When the sizer framework 206 is executed, the sizer framework configures itself. This function is provided by the configuration modules 416. Event management 418 handles all external events, often associated with user input, such as clicks on the mouse 70 or text entered at the keyboard 68. The infrastructure 420 includes the computer system S on which the sizer 200 is executing.

A Sizer "Run"

Figure 5:
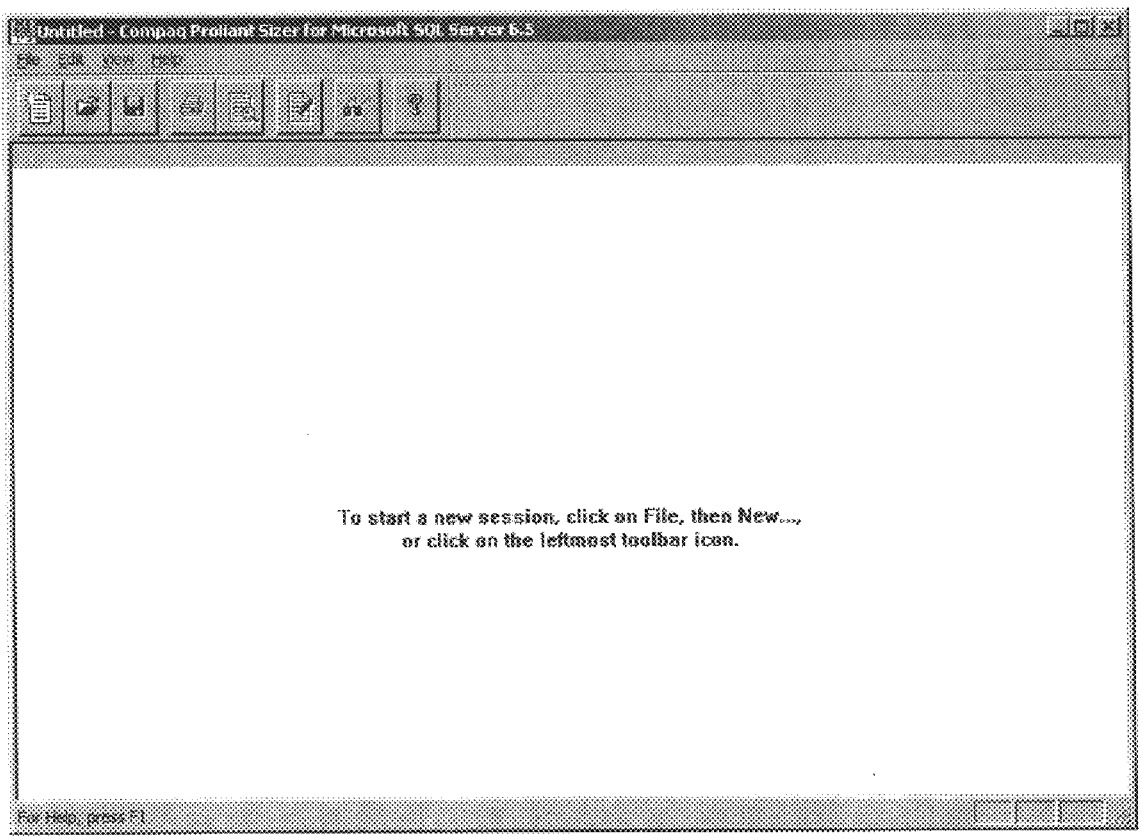

Turning now to FIG. 5, illustrated is typical sizer "run." FIG. 5 shows a screen displayed when an application sizer 202 is executed. When the application sizer 202 is executed it communicates with the sizer framework 206 by means of the framework APIs 406. This first screen is created and displayed by the sizer framework 206 navigation 410 section of the features 408. As the instruction displayed by the window indicate, a user begins a new sizer session by clicking on the "File" button on the menu bar across the top of the screen. At this point, a number of options become visible underneath the File button, including a button labeled "New." When the user clicks on the New button, a new sizer session is created. The illustrated screen layout is indicative of the widowing features provided by the Microsoft company of Redmond, Wash. Other available window formats such as the UNIX standard XWindow system or the Apple Computer Company's window system may create a different look and feel without changing the functionality of the sizer.

At the bottom of the first and subsequent screens (FIGS. 6–20), there are two additional buttons "Cancel" and "Help." The Cancel button ends the sizer session; the Help button provides the user with context sensitive help screens.

Figure 6:
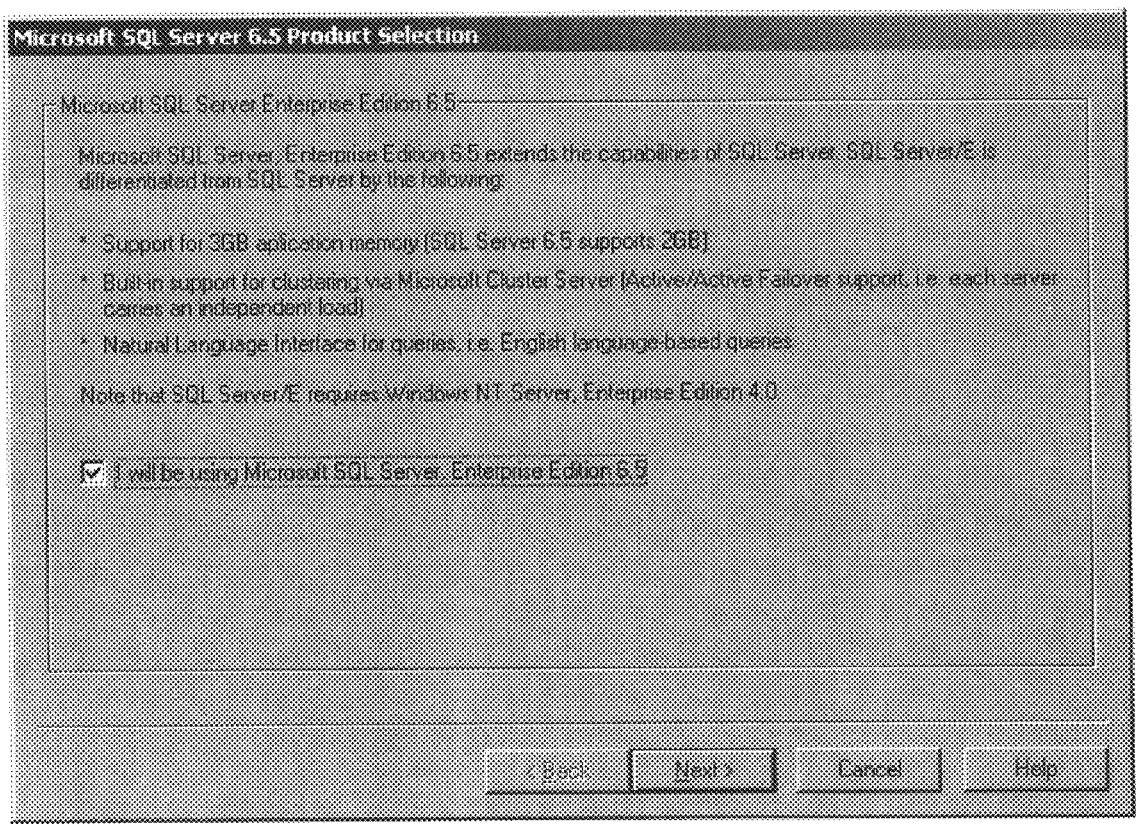

Turning now to FIG. 6, illustrated is an example of a information screen created by a new sizer session. The information screen is generated by an application sizer 202 that supports Microsoft SQL Server (MSQLS) Enterprise Edition 6.5. The purpose of the information screen is to inform the user of information specific to MSQLS. The information screen is representative of screens generated by other sizers such as a Microsoft NT server sizer or an Oracle database server sizer.

After reading the information, the user can proceed to another screen by clicking on the "Next" button located in the menu bar along the bottom of the information screen.

Figure 7:
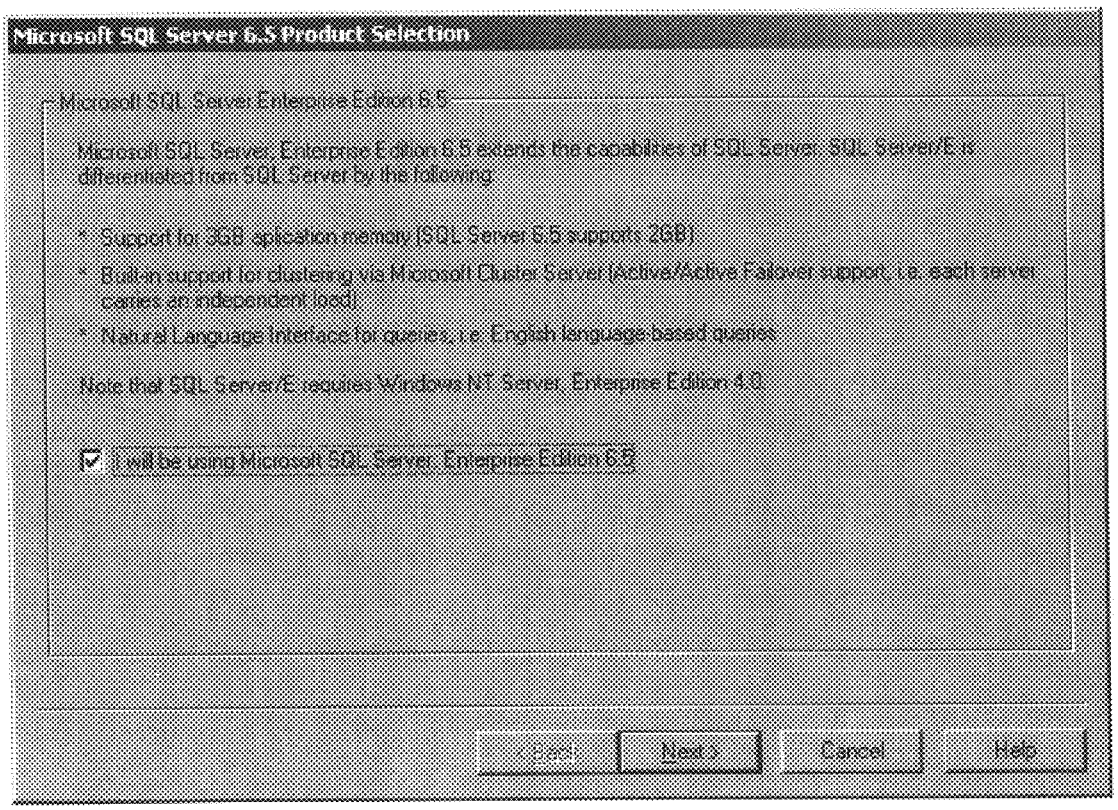

Turning now to FIG. 7, illustrated is another information screen containing information specific to MSQLS. The screens of other sizers contain information specific to their functionality. In another embodiment, there may by addition, fewer, or no information without departing from the spirit of the invention. As in FIG. 6, the user, when ready, can proceed to another screen by clicking on the Next button located in the menu bar at the bottom of this information screen.

Figure 8:
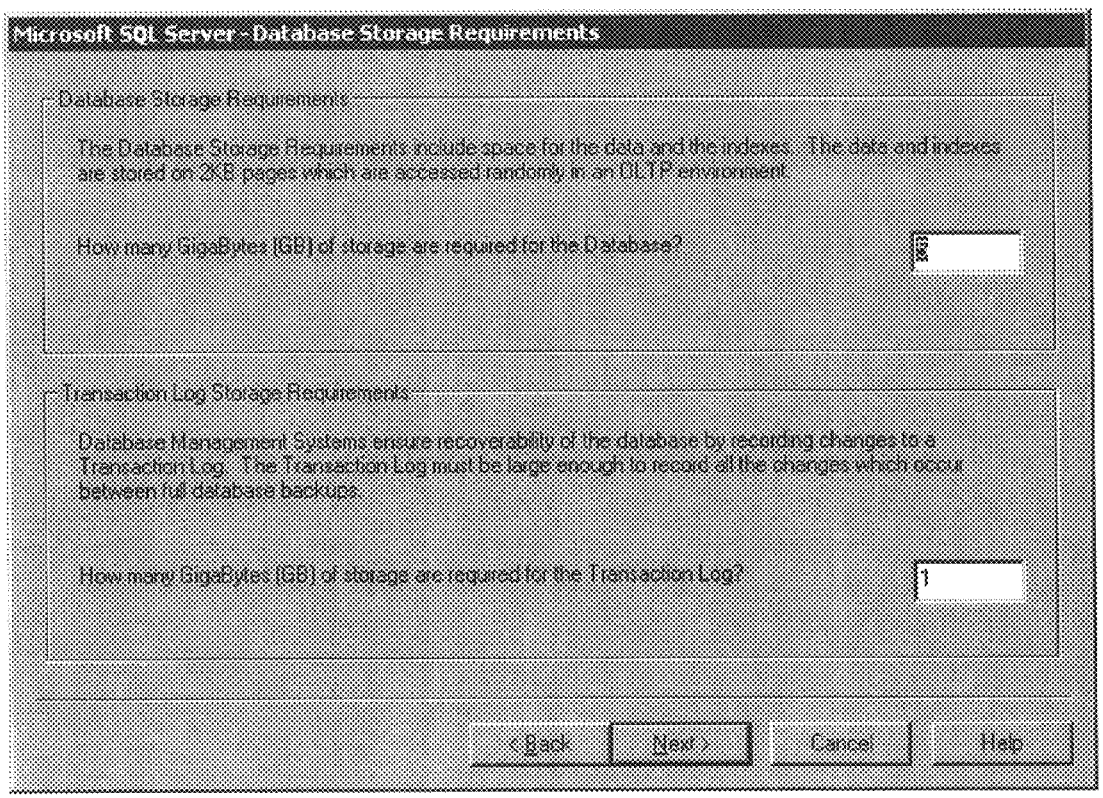

Turning now to FIG. 8, illustrated is a database storage requirement (DSR) screen of the MSQLS sizer. The user is prompted to enter data in the text boxes relating to memory storage requirements of the MSQLS application. The top prompt box allows the user to enter the user's MSQLS database storage requirements. In this example, the user has indicated that the database memory requirement is 5 Gigabytes of memory. The bottom prompt box allows the user to enter the MSQLS transaction log memory requirements. In this example, the user has indicated that the transaction log memory requirement is 1 gigabyte of memory. Another application's sizer may have different memory requirements or require information on devices other than memory such as network interface cards. The user can proceed to another screen by clicking on the Next button located in the menu bar at the bottom of the DSR screen. In the DSR and subsequent screens (FIGS. 9–20), the user can return to a previous screen by clicking in the "Back" button located in the menu bar along the bottom of the DSR screen.

Figure 9:
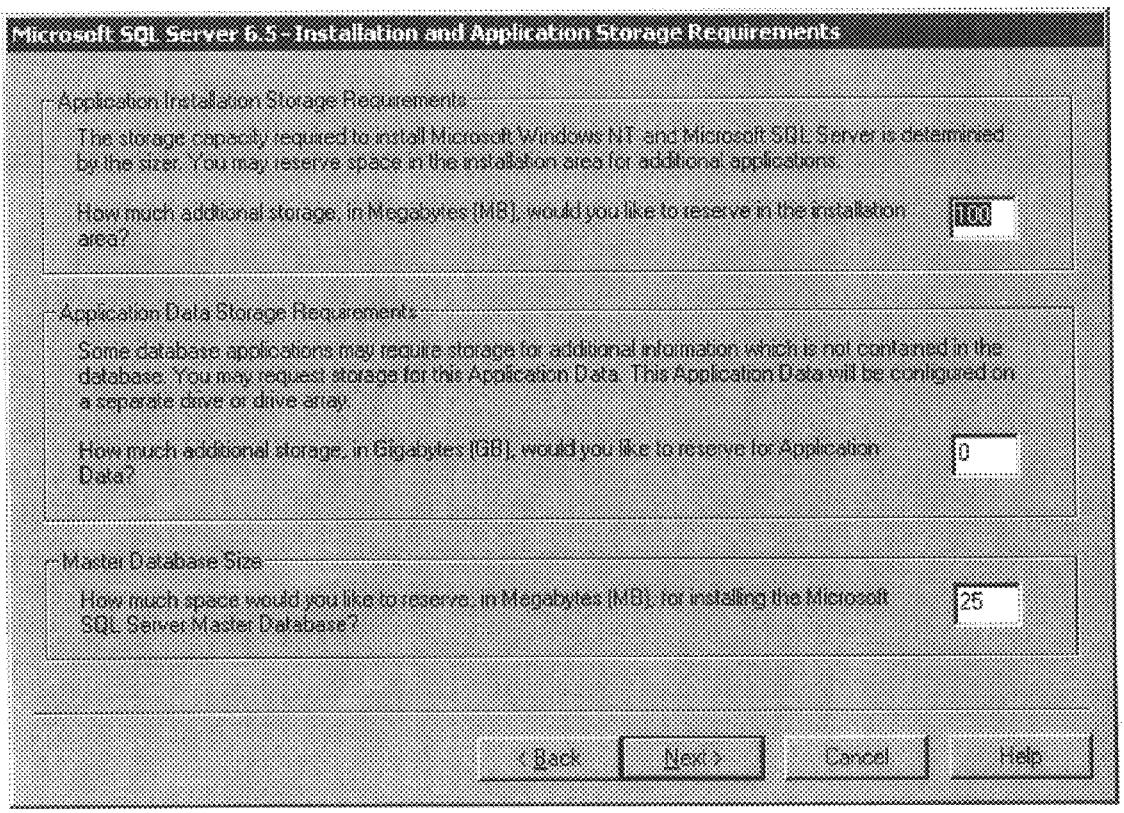

Turning now to FIG. 9, illustrated is a Installation and Application Storage Requirement (IASR) screen of the MSQLS sizer. The user is prompted to enter data in the text boxes relating to installation and application storage requirements of the MSQLS application. The top prompt box allows the user to enter the user's storage requirements for applications other than MSQLS. In this example, the user has indicated that a installation area memory requirement is 100 Megabytes of memory. The middle prompt box allows the user to enter the user's storage requirements for applications other than MSQLS. In this example, the user has indicated that the application memory requirement is 0 Megabytes of memory. The bottom prompt box allows the user to enter the MSQLS master database memory requirements. In this example, the user has indicated that the MSQLS master database memory requirement 25 Megabyte of memory. The user can proceed to another screen by clicking on the Next button located in the menu bar at the bottom of the ISAR screen.

Figure 10:
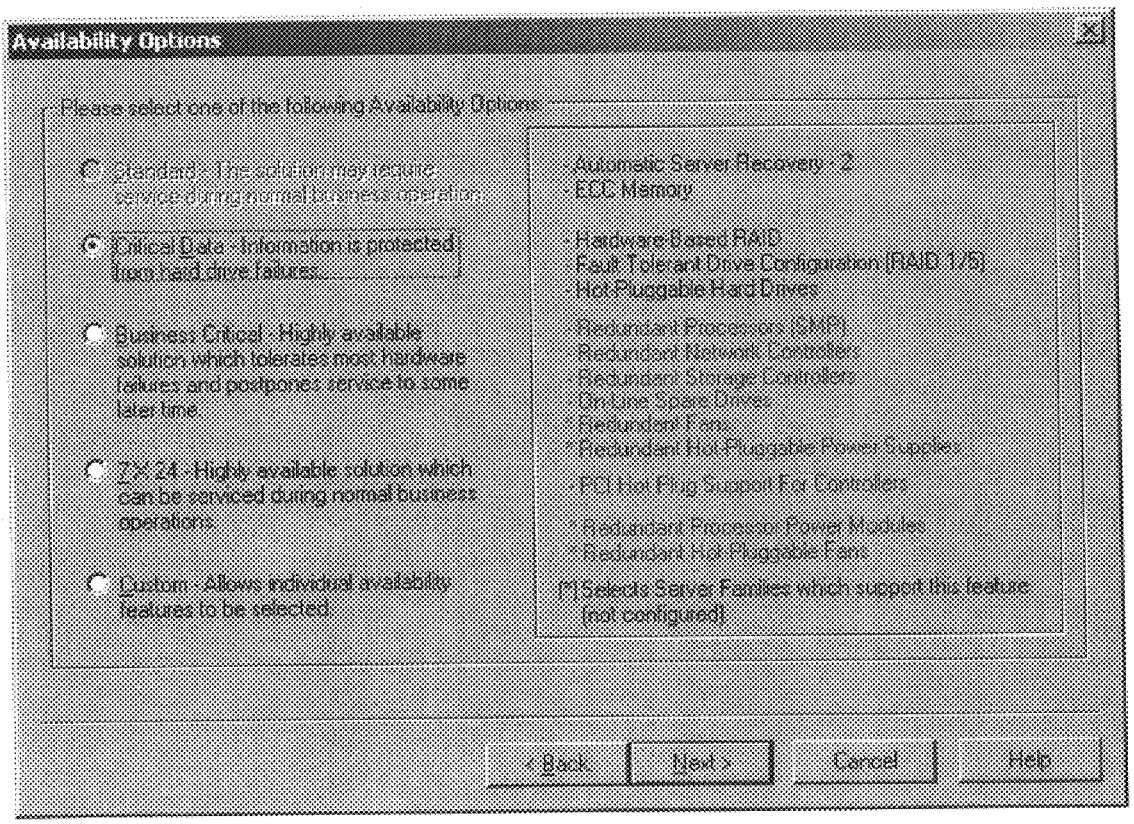

Turning now to FIG. 10, illustrated is a Availability Options (AO) screen. Along the left side of the screen are five "radio" buttons, named because only one can be selected at a time. If a second button is selected (contains a black dot), the first automatically becomes deselected. The first radio button, "Standard," is "grayed out." This indicates that the Standard availability option is not supported by the MSQLS sizer.

Availability is a user's requirement with respect to hardware failure. The second radio button, "Critical Data," (CD) is selected. The CD option protects against lost information but does not provide some of the serviceability features of latter options (see FIGS. 12–14). On the right of the screen, the hardware and configurations necessary to satisfy the CD option are highlighted and the hardware and configurations that are not necessary for the CD option are grayed out. The user can either select another availability option or choose the CD option and proceed to another screen by clicking on the Next button located in the menu bar at the bottom of the AO screen.

Figure 11:
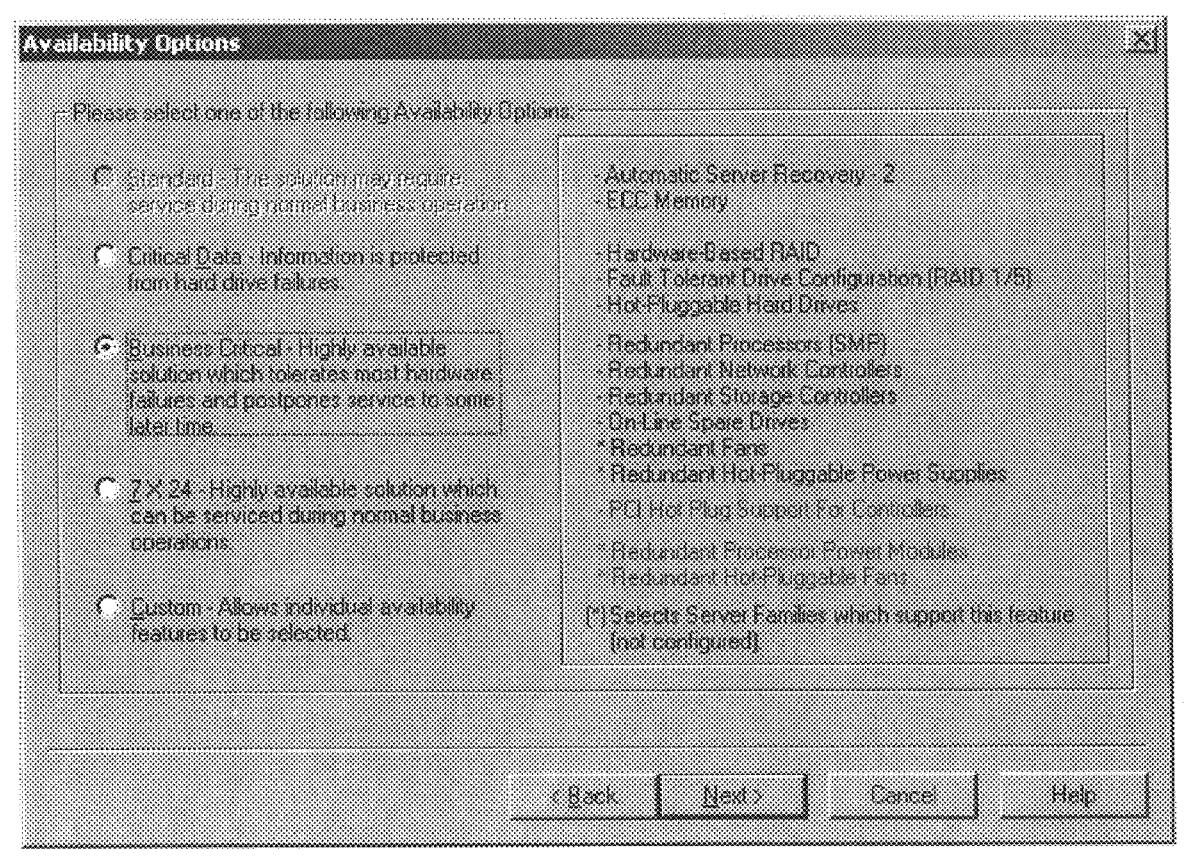

Turning now to FIG. 11, illustrated is the AO screen with the third radio button, "Business Critical," (BC) selected. In a business critical availability configuration, most hardware failures are tolerated but the service of failed components must be postponed to some later time. On the right of the screen, the hardware and configurations necessary to satisfy the BC option are highlighted and the hardware and configurations that are not necessary for the BC option are grayed out. The user can either select another availability option or choose the BC option and proceed to another screen by clicking on the Next button located in the menu bar at the bottom of the AO screen.

Figure 12:
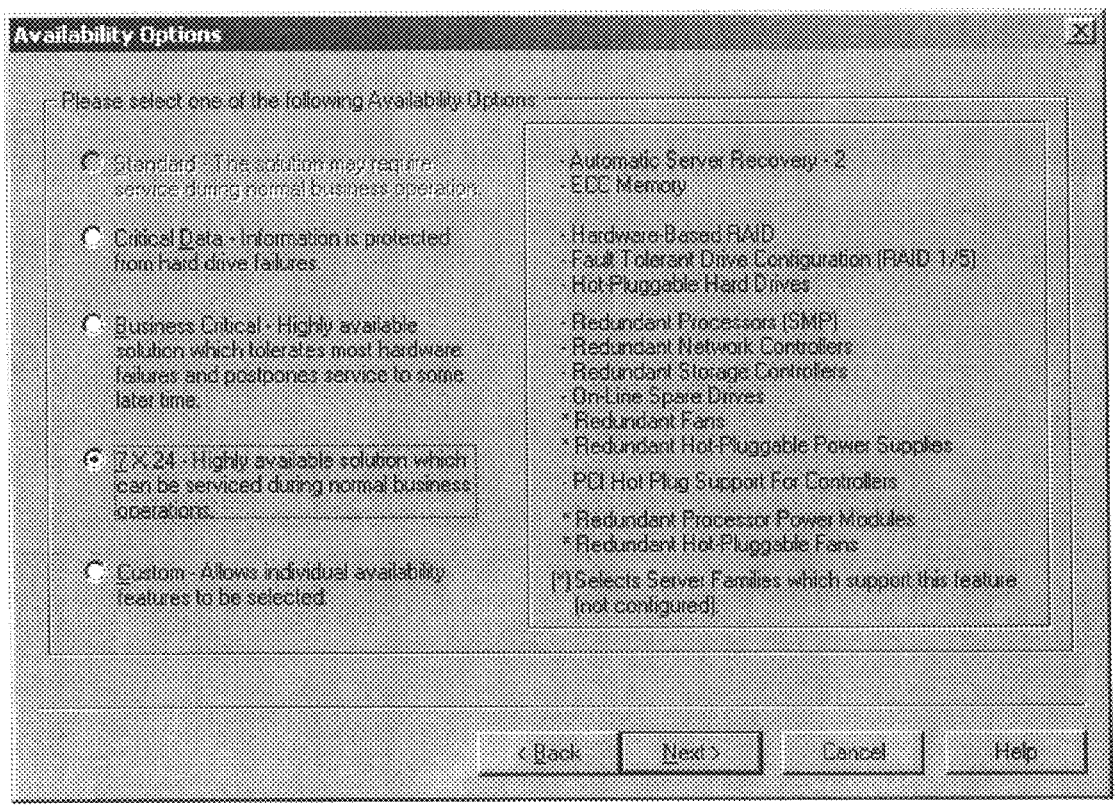

Turning now to FIG. 12, illustrated is the AO screen with the fourth radio button, "7×24," selected. In a 7×24 availability configuration, most hardware failures are tolerated and the service of failed components can be conducted during normal business operations. On the right of the screen, the hardware and configurations necessary to satisfy the 7×24 option are highlighted and the hardware and configurations that are not necessary for the 7×24 option are grayed out. The user can either select another availability option or choose the 7×24 option and proceed to another screen by clicking on the Next button located in the menu bar at the bottom of the AO screen.

Figure 13:
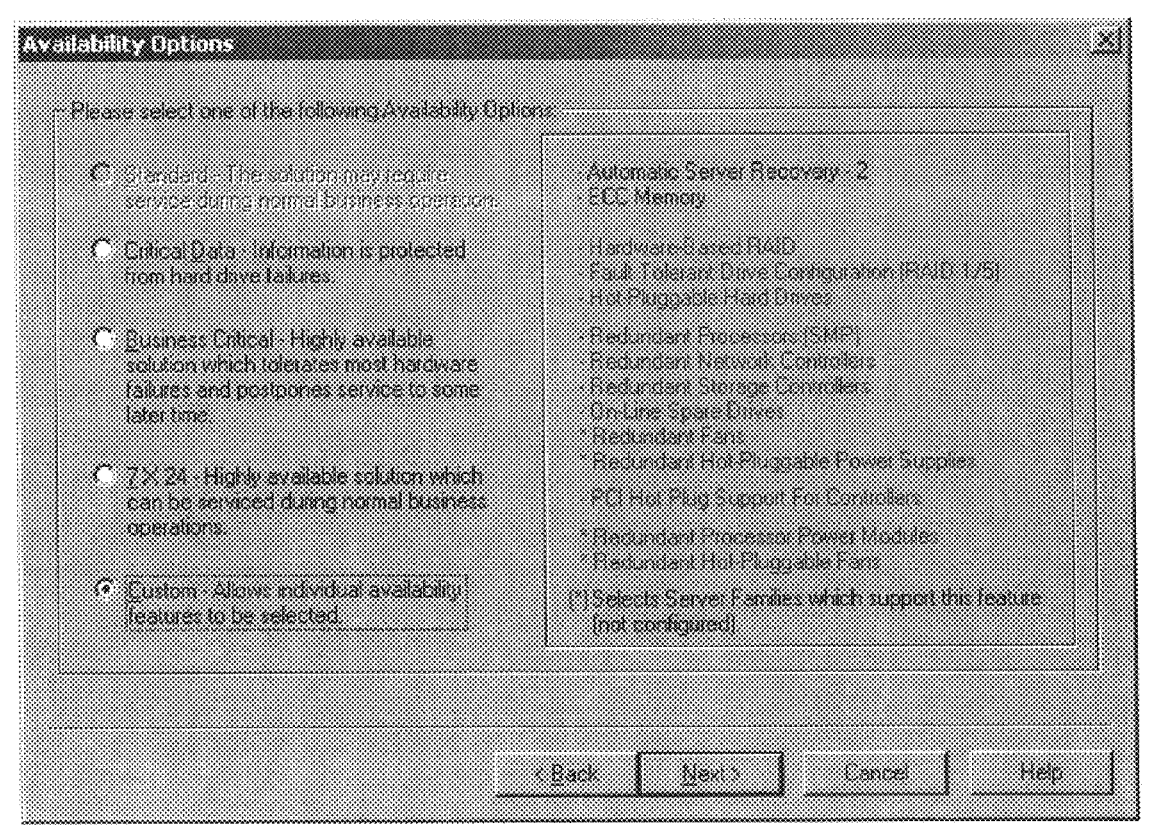

Turning now to FIG. 13, illustrated is the AO screen with the fifth radio button, "Custom," selected. The Custom option allows individual availability features to be selected by highlighting the desired options listed in the right hand panel of the screen. After selecting the desired option, the user can either select another availability option or choose the Custom option and proceed to another screen by clicking on the Next button located in the menu bar at the bottom of the AO screen.

Figure 14:
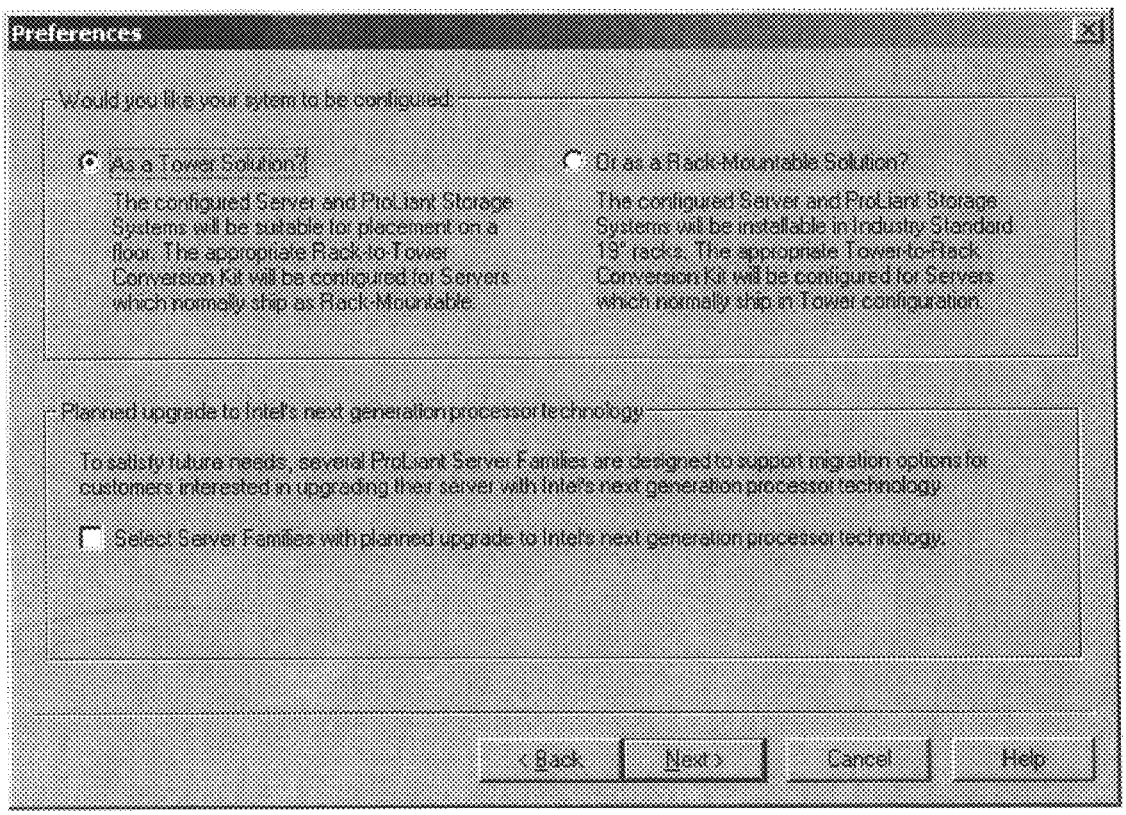

Turning now to FIG. 14, illustrated is a Preferences screen. The Preferences screen allows the user to select one of two computer case configuration by clicking on one of two radio buttons. The user can select the radio button on the top left of the Preferences screen that indicates a preference for a tower case configuration. The radio button on the top right of the Preferences screen can be selected if the user prefers a rack-mountable configuration. In this example, the Tower Solution button on the top left is selected.

The radio button on the bottom of the screen allows the user to limit the configuration options to server families that support processor upgrades. In this example, the processor upgrade option is not selected. After making the preferred selections, the user can either select other options or proceed to another screen by clicking on the Next button located in the menu bar at the bottom of the Preferences screen.

Figure 15:
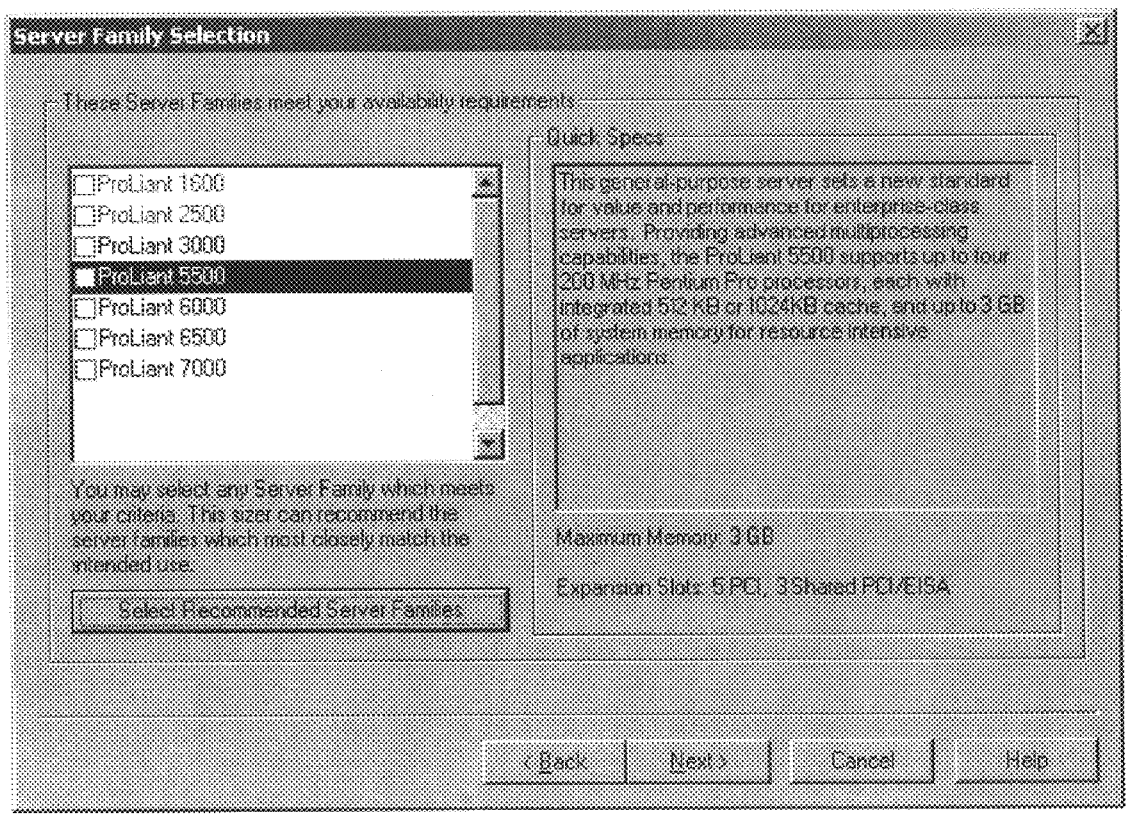

Turning now to FIG. 15, illustrated is a Server Family Selection (SFS) screen. At this point, the sizer has narrowed the number of possible server families to specific families that are available and meet the requirements specified by the user in the screens of FIGS. 8–14. A selection box on the left of the SFS screen lists the available server families and allows users to check the server families that they are interested in. Unlike the radio box, a selection box allows the user to choose multiple selections simultaneously. In this example, none of the server families have yet to be selected. Information about the highlighted selection, ProLiant 5500, made by the Compaq Computer Company, Houston, Texas, is displayed in the Quick Specs text box on the right of the SFS screen.

Figure 16:
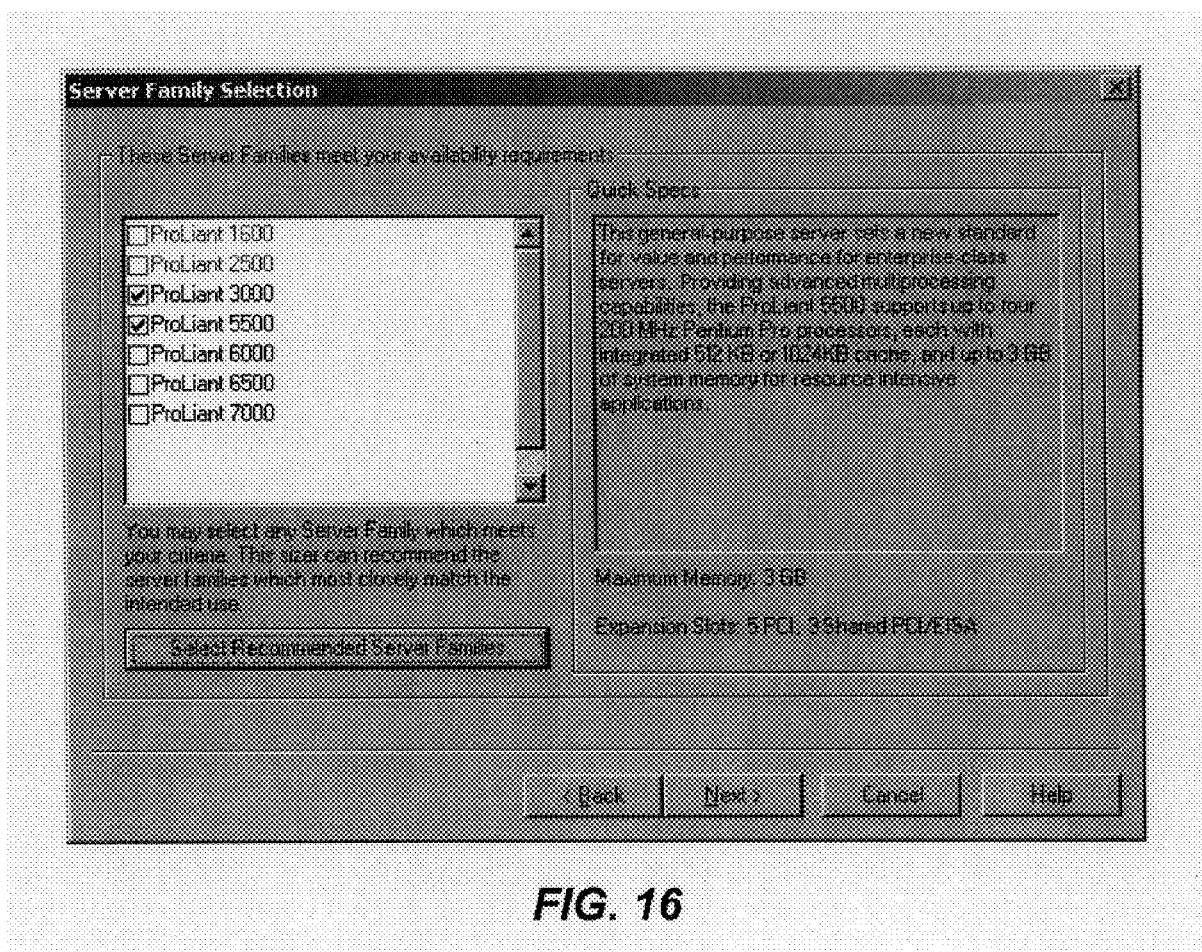
Figure 17:
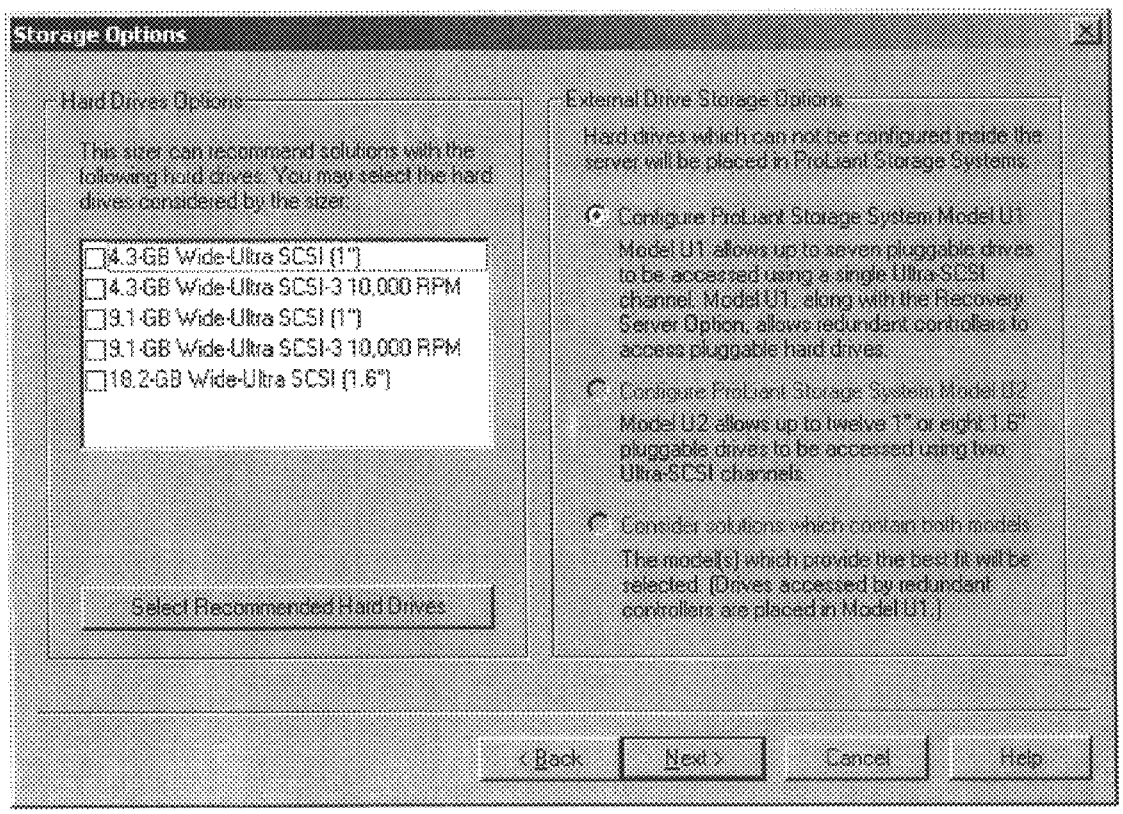

Turing now to FIG. 16, illustrated is the SFS screen with the ProLiant 3000, made by the Compaq Computer Company, Houston, Texas, and the ProLiant 5500 selections boxes indicating that the user has selected them. After selecting the desired server families, the user can select different server families, deselect already selected server families, or proceed to another screen by clicking on the Next button located in the menu bar at the bottom of the SFS screen Turning now to FIG. 17, a Storage Options (SO) screen is displayed. Displayed in a Hard Drives Options selection box on the left side of the SO screen are five options for available storage devices that meet the user's specified requirements. In this example the user has not yet selected a storage option.

The radio box on the right of the SO screen offers the user a choice of three external storage options for disk drive selections that do not fit into the case of the selected server families. In this example, the user has selected the first external storage option, a ProLiant Storage System Model U1, made by the Compaq Computer Company, Houston, Tex.

Figure 18:
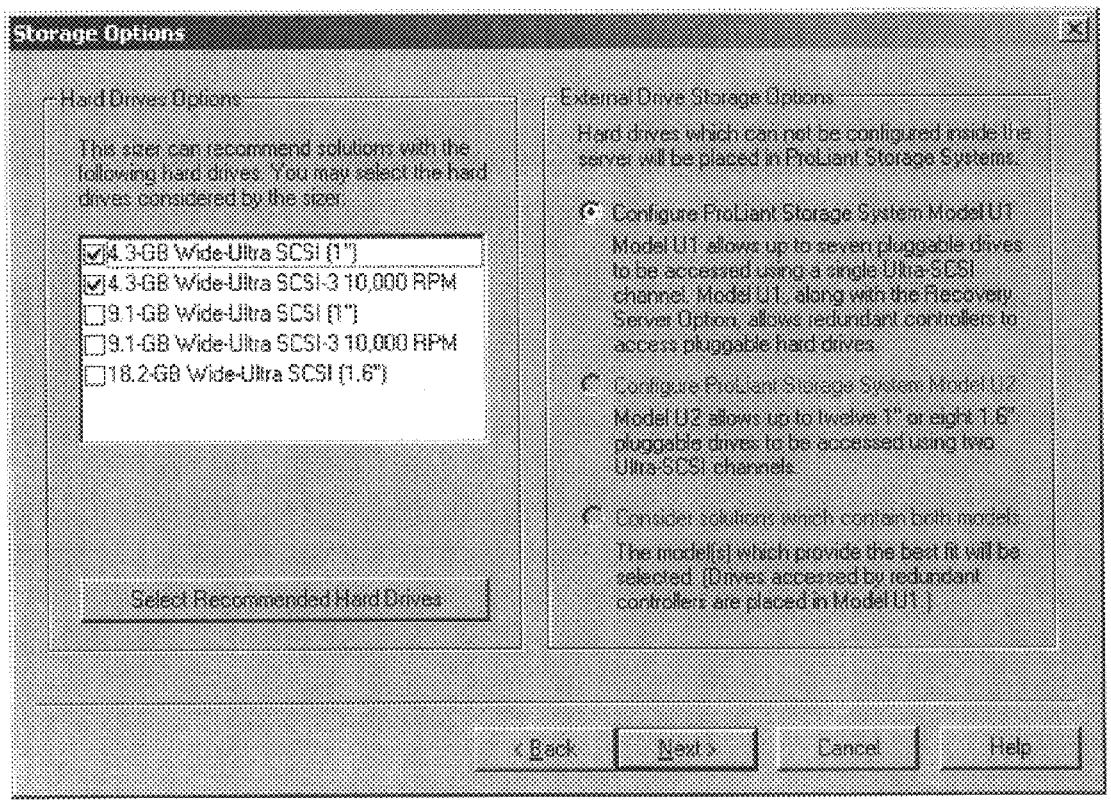

Turning now to FIG. 18, illustrated is the SO screen after the user has selected the first two disk drives in the Hard Drives Options selection box on the left of the SO screen. After selecting the desired storage options, the user can select different storage options, deselect already selected storage options, change the choice of external storage options, or proceed to another screen by clicking on the Next button located in the menu bar at the bottom of the SO screen.

Figure 19:
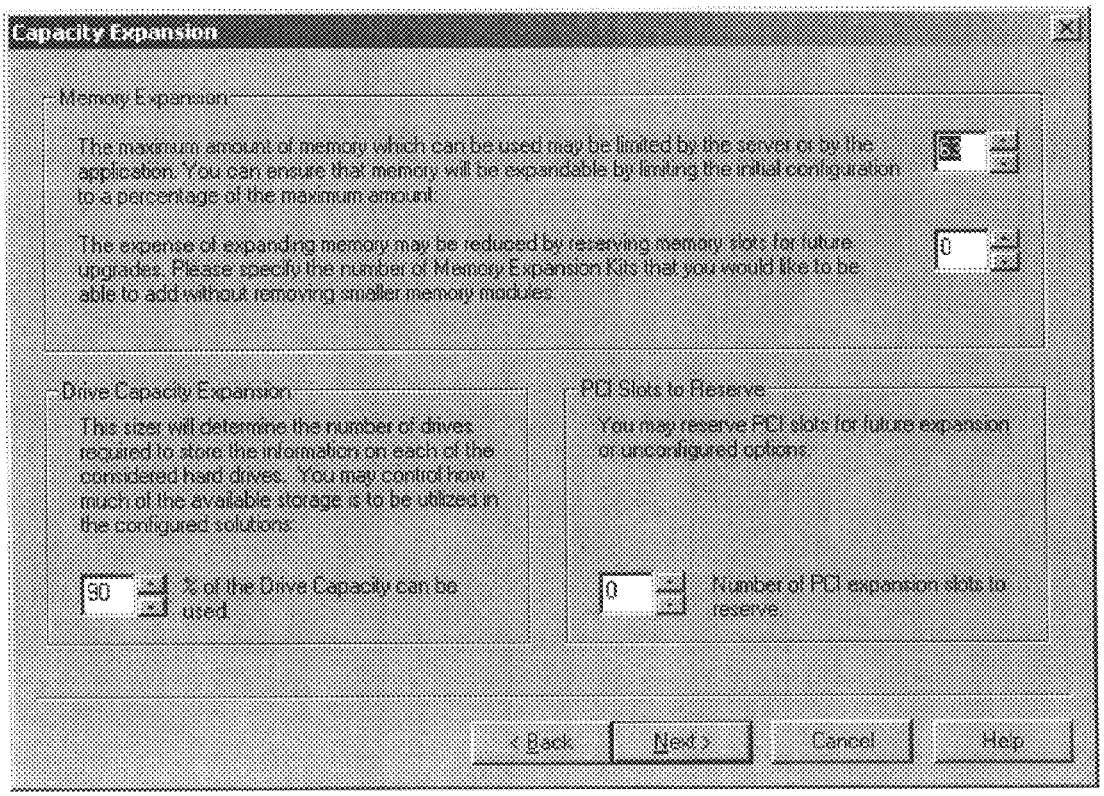

Turning now to FIG. 19, illustrated is a Capacity Expansion (CE) screen. A Memory Expansion (ME) text entry box at the top of the CE screen allow the user to enter a percent representing the amount of RAM that MSQLS and any running applications are allowed to use. The amount of RAM selected allows the user to plan for expansion by setting the current requirements at less than 100%. In this example, the user has entered a value of 63%.

The second from the top ME text entry box on the CE screen allows the user to reserve memory slots for future use. In this example the user has not reserved any memory slots. In a Drive Capacity Expansion (DCE) text entry box, the user can select the percent capacity of the selected hard drives that can be utilized. In this example, the user has selected a value of 90%.

In a PCI Slots to Reserve (PCI) text entry box, the user can select the number of PCI slots to leave open for future expansion. In this example, the user has selected 0. After selecting the capacity expansion options, the user can proceed to another screen by clicking on the Next button located in the menu bar at the bottom of the CE screen.

Figure 20:
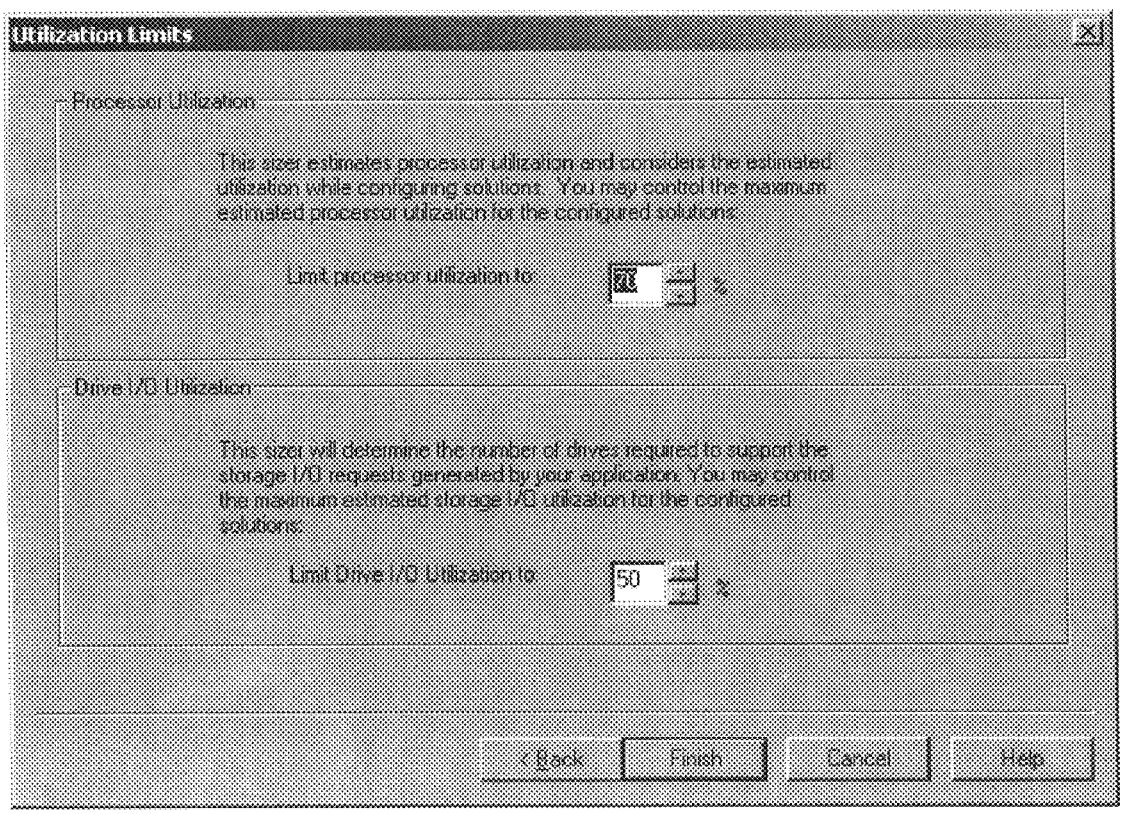

Turning now to FIG. 20, illustrated is a Utilization Limits (UL) screen. A Limit Processor Utilization (LPU) text entry box at the top of the UL screen allow the user to enter a percent representing the amount of processor time that is used when the computer is executing MSQLS or another application. In this example, the user has entered a value of 63%.

A Storage Utilization text entry box at the bottom of the UL screen allows the user to select a I/O bandwidth utilization limit. This value affects the number of disk drives that the configured system will have. In this example the user has selected a value of 50%. After selecting the utilization limits, the user can finish the sizing process by clicking on the "Finish" button located in the menu bar at the bottom of the UL screen.

Turning now to FIG. 21, illustrated is an untitled screen displaying the results of the sizing process. The sizer is displaying a list of possible configurations including, in the order the columns are displayed, a price comparison, a performance comparison, a server model, a number of processors, a size for the configured RAM, a type of disk drive, and a number of disk drives needed within the configuration. The columns represent the equipment necessary in the configured system in order to fulfill the requirements that the user entered in the screens displayed in FIGS. 4–20.

Of particular interest are the price and performance columns that rank the different configurations with respect to each other. This feature enables the user to make an informed choice of a computer system because the value of the tradeoff between price and performance is accurately quantified.

Figure 22:
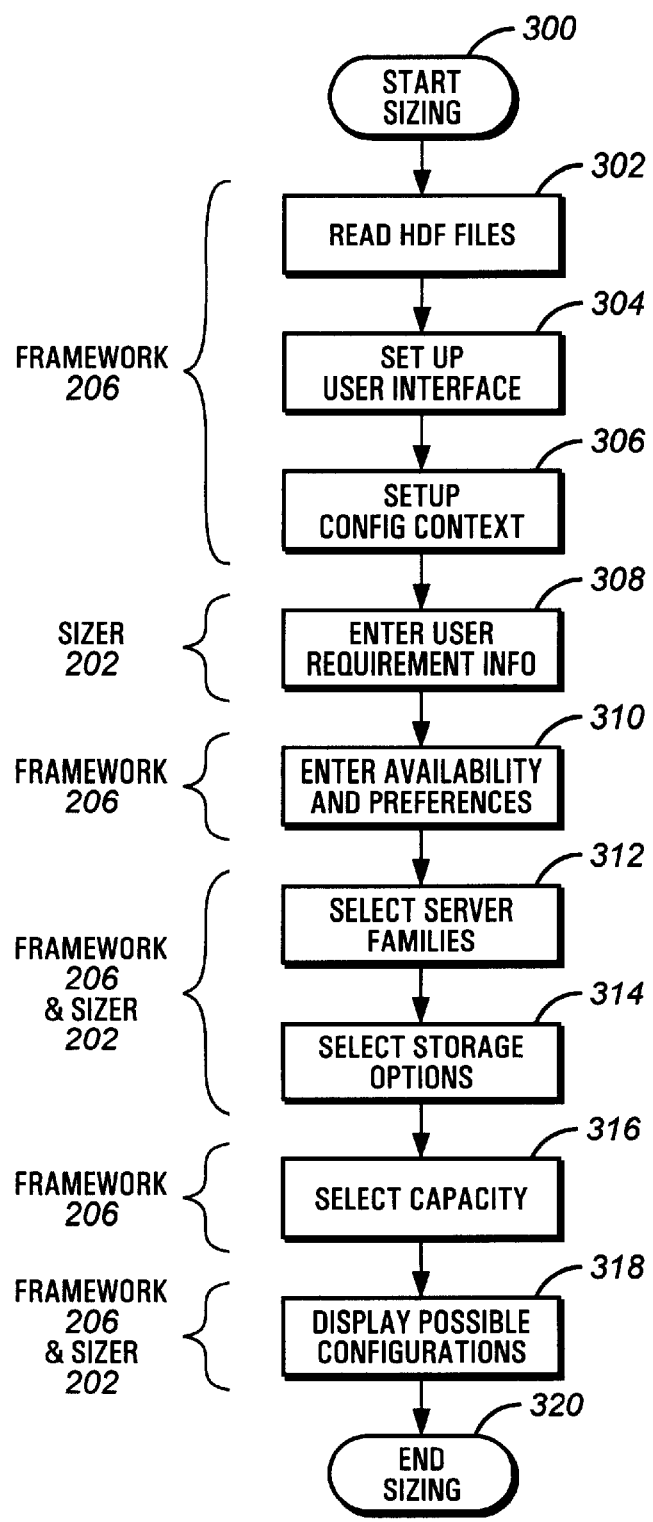
FIG. 22 is a block diagram of the process flow of a sizer program.

Turning now to FIG. 22, illustrated is a summary of the steps within the sizing process. The process begins at Start Sizing 300 and proceeds to a Read Hardware Description Files step 302. The Read HDF step 302 is performed by the sizer framework 206.

The framework 206 is responsible for maintaining and providing access to the currently available processor subsystems. The framework 206 supports all currently available processor subsystem and attributes such as:

Type of processor

Processor 32 speed and size of L2 cache 34

Maximum number of processors 32 configurable in the server

The minimum and maximum configurable amount of memory (RAM).

The maximum number of drives 20 that can be configured.

The maximum number of array controllers 14 that can be configured

Maximum number of drives 20 supported by an array controller 14 such as SMART.

The framework 206 also stores disk models that are used by the available sizers 202 and 204. For a given application model, there may be many disk models. Availability considerations such as an inherent limitation on the number of controllers and drives that may be supported by a subsystem determine the disk model that is appropriate and constrain the choice of processor subsystems.

The next step performed is a Setup User Interface step 304. This step is performed by the sizer framework 206 but the application sizer 202 uses this context to display screens via the sizer framework's APIs 406. The next step, Setup Configuration Context 306, is also performed by the sizer framework 206. The step 306 involves the sizer framework creating an area in the memory of the computer system S for storing both the final and intermediate results of the sizing process 300. The three steps 302, 304, and 306 are performed by the sizer framework because they are common to all application sizers. These steps 302, 304, and 306 can be performed concurrently with the display of the beginning screen, FIG. 5, and the Information screens, FIGS. 6 and 7, which are displayed by a sizer 202.

The first sizer 202 generated screen is displayed at the Enter User Requirements Information (EURI) step 308. The EURI step 308 displays the screens of FIGS. 8 and 9. The information requested in step 308 is specific to an application so it is maintained by application sizers 202 and 204. Once again, the screens requesting this information are generated by the sizer framework 206 upon requests from the application sizer 202 via the framework API's 406.

The Enter Availability and Preferences (AP) step 310 is displayed by the sizer framework 206 because the AP step 310 gathers information required of all sizers regardless of the application. The screens displayed for step 310 include FIGS. 10–14. The framework 206, according to one embodiment of the present invention, supports four levels of fault tolerance: Uninterrupted, Safe interruption, Unsafe interruption and Unsafe (see table below).

| Fault Tolerance | In the event of a single disk failure: |
|---|---|
| Uninterrupted | The system, applications, and data would remain available. |
| Safe Interruption | Application availability may be interrupted by data loss. No work is lost. Applicable to products which log activity, e. g. Exchange Server or SQL Server. |
| Unsafe Interruption | Application availability may be interrupted by data loss. All work since the last backup may be lost. |
| Unsafe | The entire system, including the operating system and applications, may require reinstallation. Data may be unrecoverable. |

The framework 206 accepts a user's fault tolerance selection and communicates the fault tolerance selection to the product sizer 202. The framework 206 supports configuration drives for server recovery options. Server recovery options affect the placement of data areas and require that write caching in a controller such as the SMART-2 controller be disabled. The framework 206 supports the following server recovery options, Automatic Server Recovery, On-line Server Recovery and Standby Server Recovery. The framework 206 accepts a user's selection of server recovery option and communicates the server recovery option to the product sizer 202.

The next two steps 312 and 314 are generated by the sizer framework 206 but the information displayed is the result of an interaction between the sizer framework 206 and a application sizer 202. For example, the sizer framework 206 maintains a list of all the available server families and presents the list to the application sizer 202. The application sizer 202, knowing the requirements of its specific application, may know that some server families are unsuitable. The application sizer 202 trims the list of server families supplied by the sizer framework 206 and returns the trimmed list to the sizer framework 206 for display in the screen of FIGS. 15 and 16. The same interaction between the sizer framework 202 and the application sizer 206 takes place to create the displayed list of hard drive options displayed in the screens of FIGS. 17 and 18.

The sizer framework 206 generates the screen of FIGS. 19 and 20 in step 316. The information on capacity expansion, processor utilization, and drive I/O utilization is common to most application sizers 202 and 204.

When selecting the appropriate storage configuration, one embodiment of a sizer:

1. Tests the ability of each disk model to support the storage requirements. This is dependent on the capacities of the available hard drives.
2. Determiines the quantity of the selected drive that is required to support I/O workload of the database data available that satisfies both the capacity and performance requirements.
3. Selects the drive configuration for the drive arrays which do not include the database data. The hard drive selected for these drive arrays may differ from the drive selected for the drive array containing the database data.
4. Selects the disk model which requires the fewest drives.

The sizer 200 also supports the increment/decrement operations on the number of drives configured in the storage subsystem. In this case, the sizer selects the disk model and hard drive capacities which optimally satisfy the number of drives specified (note that the hard drives selections may be constrained by CSF). The range of valid disk quantities is bounded on the lower end by the capacity and performance requirements and on the upper end by the number of drives configurable on the server.

Finally, in step 318, the sizer framework 206 and the application sizer 202 interact with each other to develop a list of possible recommendations as illustrated by the screen in FIG. 21. The performance calculation is supplied by the application sizer 202 and the remaining information is supplied by the sizer framework 206.

The following pseudo code illustrates a typical algorithm that would evaluates drive cage/controller combinations before the options are displayed in step 318.

```
{BOOL DCFit::FitHelper (StorageCfg & storCfg, const StorageConstraint storConst)
{
Preprocess the passed in storage constraints
If (controller/drive cage table not built yet) build it;
Define a stop point for the drive cage search;
Find a suitable initial drive cage controller combination;
Do {
    If (current drive cage combo exceeds the cutoff) bail out;
    For (int j = 0; i < dcComboRaw.Getsize(); i++) {
        Unfold the drive cages from raw drive cage combo;
        Get controller statistics from the chosen combo;
        Pick a suitable controller combination;
        For (int j = 0; j < ctlComboRaw.Getsize(); j++) {
            Remove previously available controller;
            Unfold the controllers from the raw controller combo;
            Start the join engine; if it does not start, no join possible;
            Do {
                Join the controller and drive cage combination;
                Compute how many SCSI connectors necessary;
                If (number of outlets <= total SCSI connectors) {
                    If (successful fitting combo) {
                        Check # of slots consumed;
                        If (slot requirements feasible) {
                            Set # of drives for the configuration;
                            Retrieve StorageCfg for the configuration;
                            Retrieve object representation for the configuration;
                            Return TRUE;
                        }
                    }
                }
            } While (dcjoin.Next())
        }
        If (!nextCombo(dcComboRaw, techIndex)) Return FALSE
    }While(1)
    Return FALSE
}
```

When the quantity is selected, the list of available hard drives is checked to determine if a smaller drive is Additional examples of code used in one embodiment of the present invention are listed in the source code appendix of copending "Method of Developing Physical Requirements for Computer Configuration." The pseudo code above is illustrative of only one method of evaluating controller drive/cage combinations. The code could easily be designed and/or written differently, containing fewer or additional steps and still have the same effect. Similar code can also be utilized to determine the possible combinations of any other components that are dependent upon each other. In addition, one embodiment utilizes a hardware definition language (see previously incorporated U.S. patent application entitled "Method For Describing And Storing Descriptions Of Hierarchical Structures") and the virtualization of components and enclosures (see previously incorporated patent application entitled "Method Of Developing Physical Requirements For Computer Configuration").

The sizer process 300 concludes in step 320. The steps and the ordering of the steps is illustrative of one embodiment of the present invention. The design can be changed without detracting from the spirit of the invention.

Price/Performance Calculations

As part of a sizer run, the sizer creates a recommended server configuration based on a relationship between price and performance. Specifically, the sizer determines performance of a candidate system, determines its price, and normalizes the performance to price before displaying the candidate system to the user based on the user specification of performance and configuration requirements.

In one embodiment, the relative performance is determined based on response time estimate. That is, the performance is specified by the amount of time required by all the hardware components together to perform the work required to complete a single "SQL server" transaction. In this embodiment, the total response time determined by the sizer is the sum of the processor time and the time required to perform database reads according to the following equation:

$$\text{Response Time} = \text{Processor Latency} + \quad [\text{equ. 1}]$$

Time to perform a database read * Physical database reads per transaction

In the above equation, the processor latency is the amount of time required to process a transaction. This includes the transaction processing time and the time waiting in a queue for processor service. The time in the queue is dependant on the queue length, which is calculated as:

$$\text{Queue length} = \text{Processor Utilization}/(1 = \text{Processor Utilization}) \quad [\text{equ. 2}]$$

In this equation, the processor utilization is in the range 0 . . 1. For example, utilization of 50% yields a queue length of 1, while 75% utilization yields a queue length of 3.

The total latency is determined to be:

$$\text{Latency} = (\text{Queue length} + 1)^*(\text{Processor Service Time}^* \text{#of CPUs}) \quad [\text{equ. 3}]$$

The numeral one is added to the queue length to account for the time the transaction is actually running. The processor service time is multiplied by the number of central processing units (CPUs) to obtain the time required for a transaction to run on a single CPU. As the number of CPUs increase, the time required decreases—since a single transaction does not execute in parallel on multiple processors, the service time must be linearized. In equation 3, the processor service time estimates the amount of processor time that a single transaction requires to complete. This time is estimated on the number of logical database reads, physical database reads, and physical database writes per transaction. The number of logical database reads per transaction is constant with a modeled transaction load of 131.2. The number of physical reads is determined by the cache hit ratio:

$$\text{Physical Reads} = \text{Logical Reads} * (1 - \text{Cache Hit Ratio}) \quad [\text{equ. 4}]$$

The number of Physical Writes is also affected by the Cache Hit Ratio, and is computed as follows:

$$\text{Physical Writes} = -0.0135^* \text{ Cache Hit Ratio}^2 + 2.0632^* \text{ Cache Hit Ratio} - 70.511 \quad [\text{equ. 5}]$$

The result of this equation is bounded between 4 and 7.

The processor utilization defined in equation 2 is estimated by multiplying the transaction processor time by the transaction rate. The transaction rate is set based on the number of users:

$$\text{Transaction Rate} = \text{Number of users} / (20.9 + \text{target response time}) \quad [\text{equ. 6}]$$

If a default target response time of 1 second (1000 milliseconds) is used, 100 users would create a transaction load of: 100/21.9, or 4.566 transactions per second. Multiplying the rate times the transaction processor time on a particular processor subsystem yields the number of milliseconds of processing time required each second on that processor subsystem. Dividing this number by 10 gives processor utilization in the range in the 0–100 range. This number is compared against the maximum processor utilization specified by the user (default 70%) to determine if the processor should be considered.

Memory calculations are performed to (1) ensure that enough memory is available for the application to run, and (2) determine the amount memory available for caching database data. Given a certain amount of memory, a specified amount is subtracted as will be needed by the operating system.

The Cache Hit Ratio in equations 4 and 5 is determined by the data cache available using the following formula:

$$\text{Cache Hit Ratio} = (3.9162^* \log (\text{Cache Pages}/\text{Database Mb}) + 79.856)/100 \quad [\text{equ. 7}]$$

This ratio is constrained to be between 0.84 and 0.93.

The time required to perform a database read is dependant on the type and quantity of hard drives used, the RAID level used, the I/O load, and the amount of hard drive that is utilized for storage. The I/O load is dependant on the transaction rate and the cache hit ratio is defined as follows:

$$\text{Reads per sec} = \text{transaction} * \text{logical reads per transaction} \quad [\text{equ. 8}]$$

$$\text{Writes per sec} = \text{transaction rate} * \text{physical writes per transaction}$$

The I/O rate per drive is calculated by the reads per sec. writes per sec, RAID level, and drive quantity:

$$\text{I/O per sec per drive} = (\text{reads per sec} + \text{writes per sec} * \text{RAID factor})/\text{drive quantity} \quad [\text{equ. 9}]$$

Where the RAID factor is 1 for RAID 0, 2 for RAID 1, and 4 for RAID 5. Given the number of I/O per sec per drive the milliseconds required to complete a read is calculated using a polynomial equation:

$$\text{Read Ms} = a^* \text{ I/O Rate}^2 + b^* \text{ I/O Rate} + c, \quad [\text{equ. 10}]$$

Where a, b and c are determined for each drive type through performance testing.

Using all this performance information to determine candidate system performance, that performance date is then normalized to price to give a price performance normalized display, such as is illustrated in FIG. 21.

Object Configuration Structure

Figure 23:
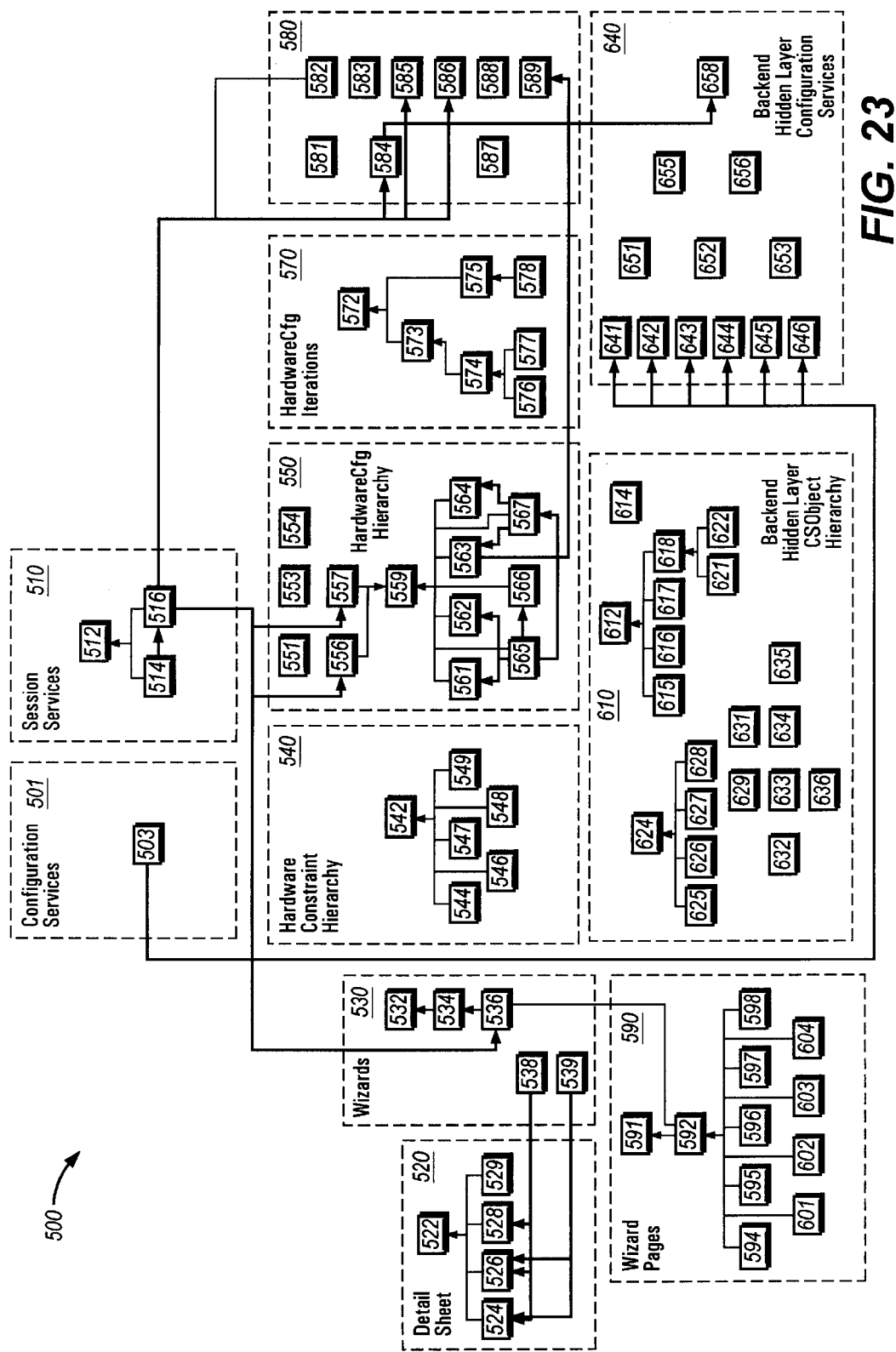
FIGS. 23–30 illustrate the object hierarchy of the sizer.

Turning to FIG. 23, illustrated is an object hierarchy 500 implemented by the sizer framework. A variety of objects are present in the sizer framework for use by the specific application sizer. This includes configuration services 501, session services 510, the detailed sheet 520, various "wizards" helpers 530, wizard pages 590, a hardware constraint hierarchy 540, a hardware configuration hierarchy 550, hardware configuration iterators 570, and various utility sizer objects 580. Further, a background objects are provided 610 as well as background configuration services 640. FIGS. 24–30 provide further details of this object hierarchy.

Figure 24:
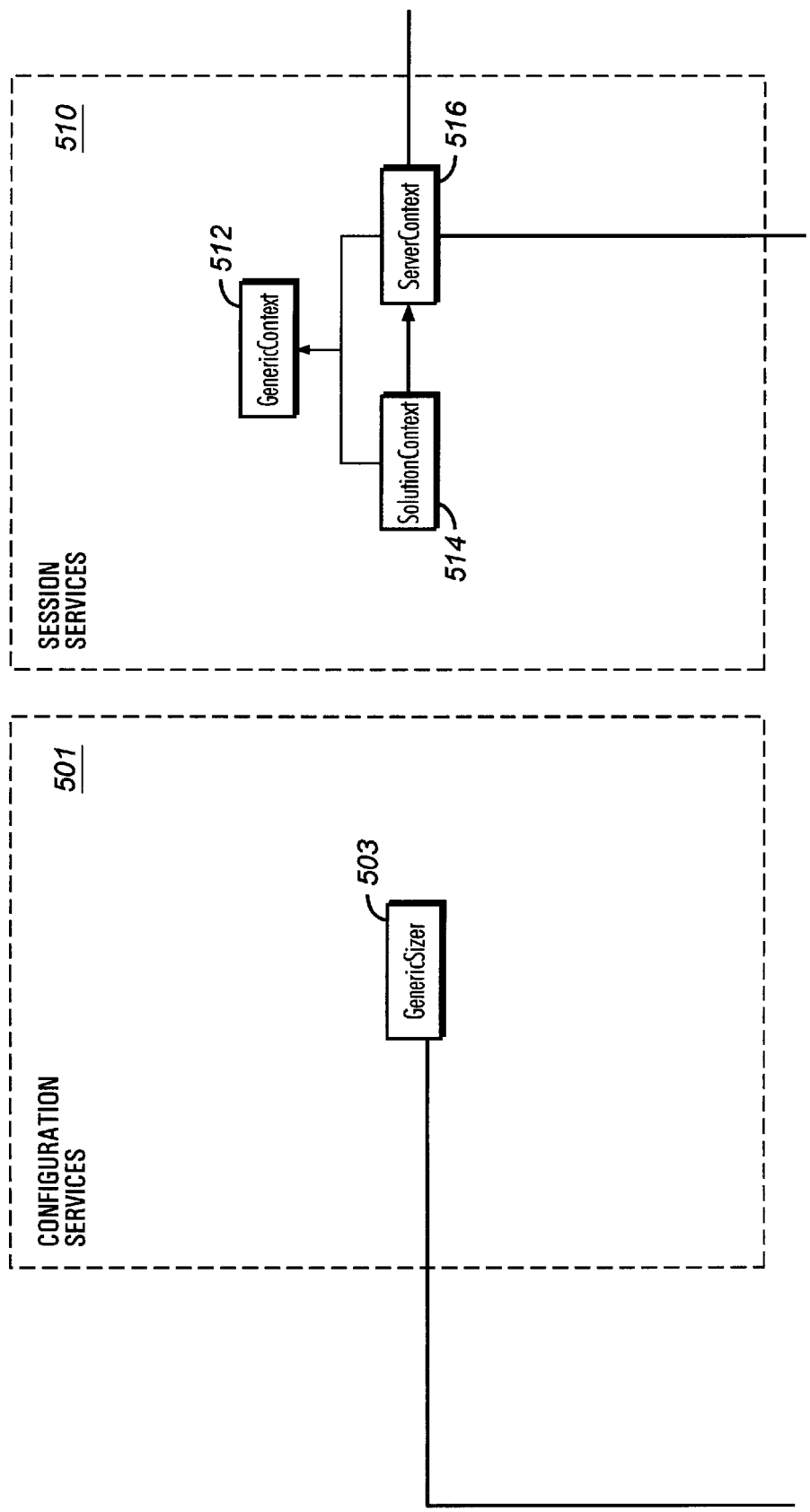

Referring to FIG. 24, the configuration services 501 include a GenericSizer object 503 which is the basic sizer object. Turning to the session services 510, a GenericContext object 512 is the generic session class that is not specific to any sizing task. A ServerContext object 516 provides data for this particular session for server sizing. A SolutionContext object 514 provides session data for "solution" sizing. A "solution" typically involves multiple servers. A GenericSolution object (not shown) is an implementation of a solution—again employing multiple servers.

Figure 25:
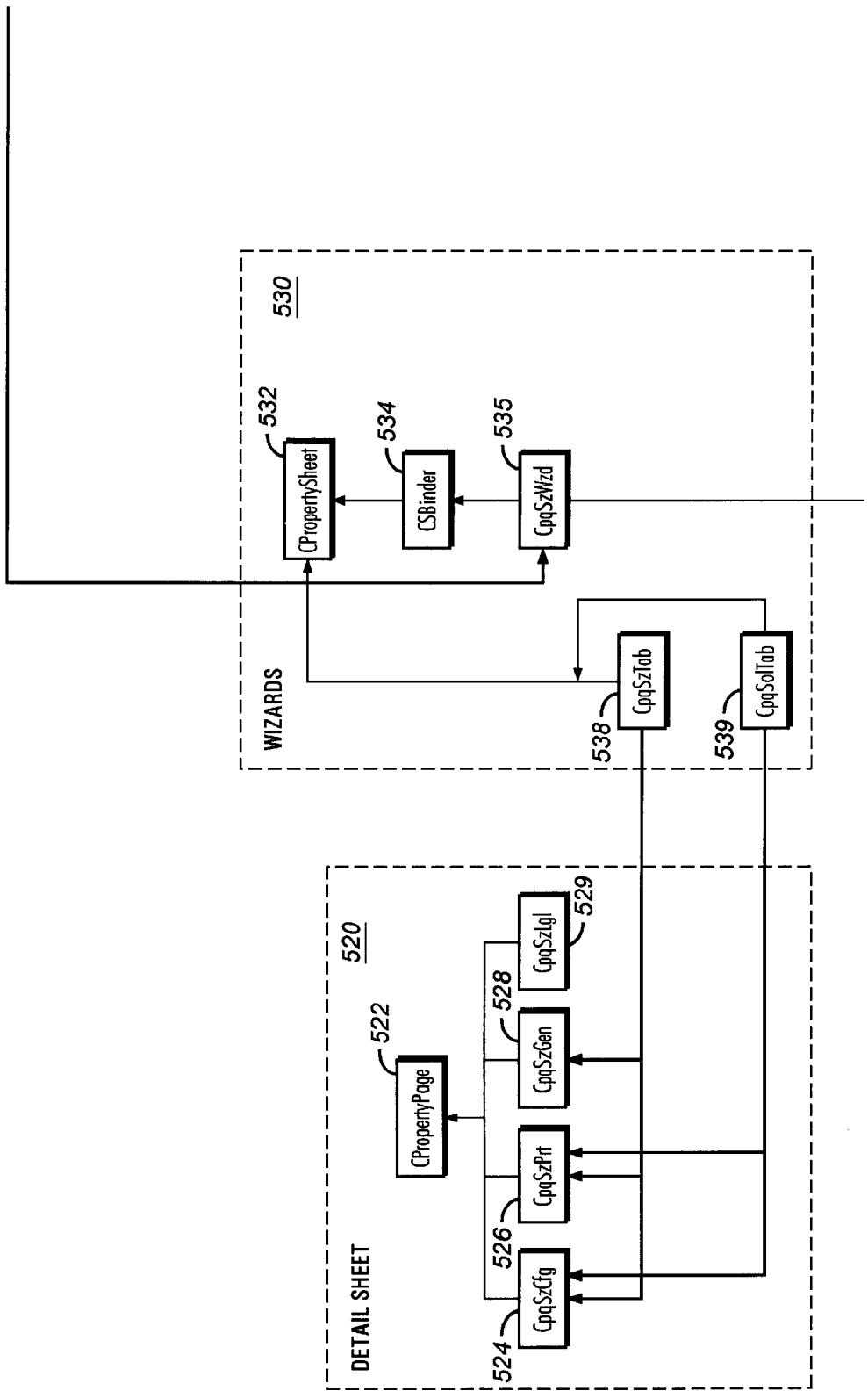

Turning to FIG. 25, a number of other objects are shown. The detail sheet 520 includes a CPropertyPage object 522 that encapsulates a number of other objects, including a size configuration object CpqSzCfg 524 that shows the configuration in a tree like view, a part number CpqSzPrt object 526 that shows part characteristics, such as by part number, part description, and quantity. A general details object CpqSzGen object CpqSzGen 528 shows general details of the recommended system, such as drives, name, etc. and a legal disclaimer object CpqSzLgl object 529 includes legal disclaimers for display during sizer operations.

Turning to the wizards sheet 530, number of objects are based on a CPropertySheet class 532, including a CpqSzTab object 538 which is a binder object for server details, a CpqSolTab object 539 which is a binder object for the solution details. Further, a CSBinder object 534 encapsulates a CpqSzWzd object 535, which binds together the wizard pages.

Figure 26:
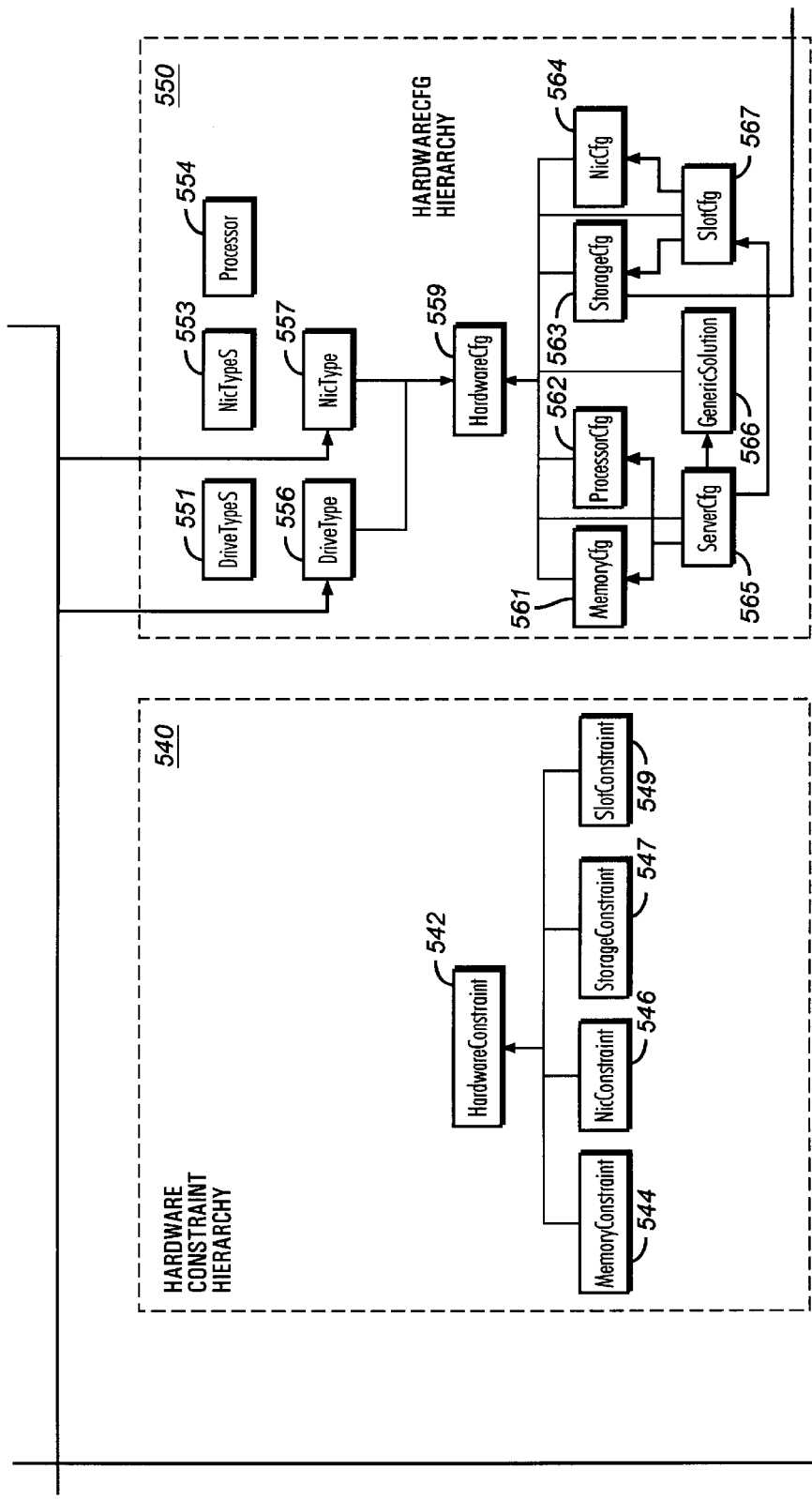

Turning to FIG. 26, in the HardwareConstraint Hierarchy 540 are a number of HardwareConstaint objects. A HardwareConstdint object 542 is a prototype for remaining HardwareConstr it objects. These include a MemoryConstraint object 544, which represents memory constraints. A NicConstraint object 546 similarly represents constraints on network interface controllers. A StorageConstraint object 547 represents storage constraints. A SlotConstunt object 549 represents constraints on PCI slots.

The HardwareCfg Hierarchy 550 includes a number of objects. These include a DriveTypeS object 551 and a DriveType object 556, which represent the type of drive, a NicTypeS object 553 and a NicType object 557, which represent a network interface card, and a Processor object 554, which represents a type of processor. A HardwareCfg object 559 is a prototype for the DriveType object 556 and NicType object 557, as well as a number of remaining hardware objects. These objects include a MemoryCfg object 561, which represents a memory subsystem, and a ProcessorCfg object 562 which represents a processor subsystem. Both of these objects are related to a ServerCfg object 565, which represents a server. Employing the ServerCfg object 565 are a GenericSolution object 566, which represents potential solutions (that is, multiple servers) as a candidate system. A SlotCfg object 567 is also related to the ServerCfg object 565, and defines PCI slots. A StorageCfg object 563 represents a storage subsystem, and a NicCfg object 564 represents a network interface card subsystem.

Figure 27:
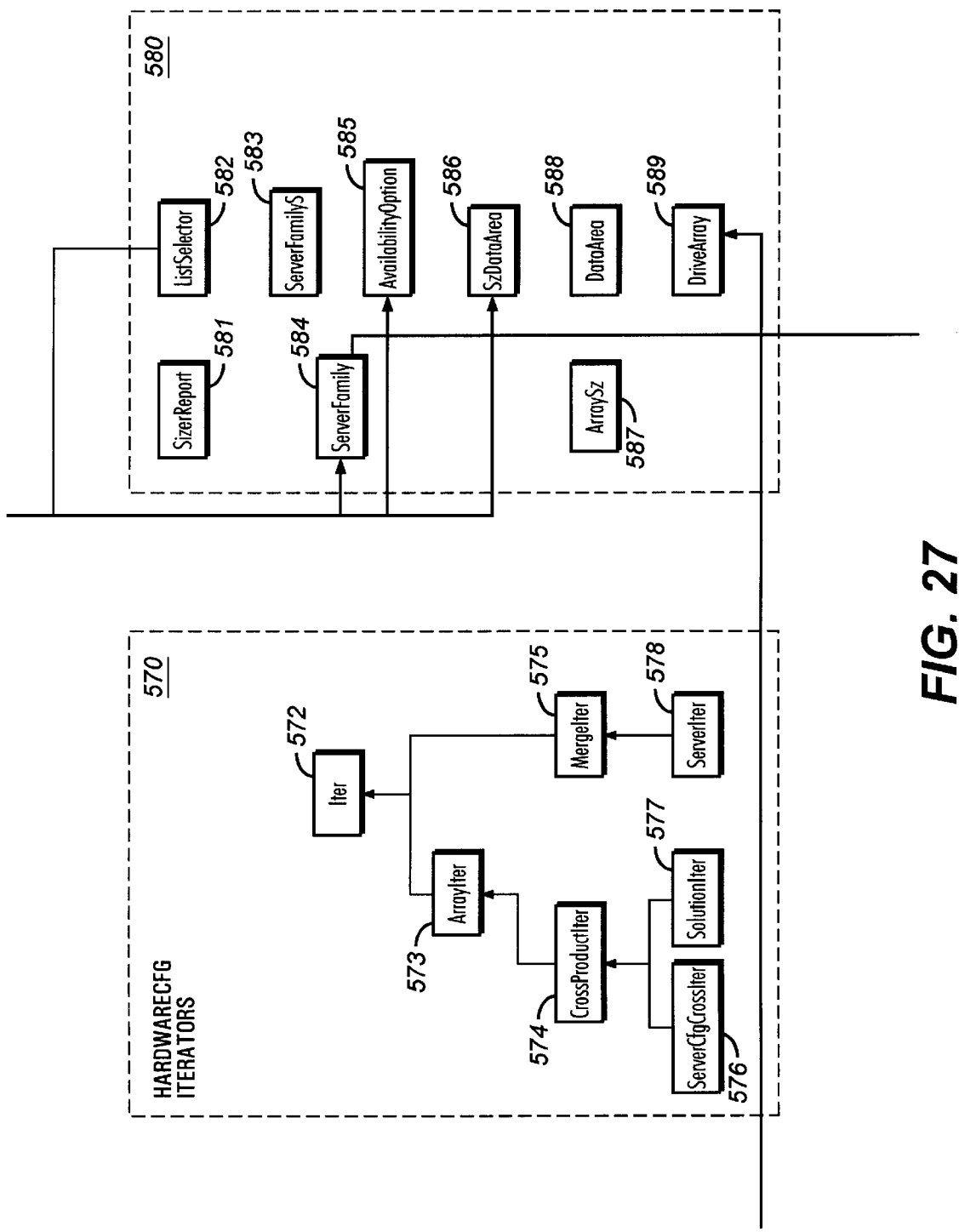

Turning to FIG. 27, the HardwareCfg Iterators Hierarchy 570 include a basic object Iter 572, which is a prototype of a basic iterator. Of that class is an array iterator object ArrayIter 573, which implements navigation within an array, and a merge iterator MergeIter 575, which merges sorted sequences represented by iterators into a single sorted sequence.

A cross-product iterator CrossProductIter 574 cross-products the contents of iterators and sorts the output according to price. A ServerCfgCrossIter iterator 576 returns a sorted sequence of servers, given iterators of subsystems, where only one server family is assumed. A SolutionIter object 577 returns a sorted list of solutions given iterators representing servers. A ServerCfgIter iterator 578 returns a sorted sequence of servers given iterators of subsystems, where multiple server families are assumed.

Turning to the general objects in the utility 580 (which are generally utilities), a SizerReport object 581 provides a reporting functions, and a ListSelector object 582 handles and allows selection within a list. A ServerFamilyS object 583 is a server family selection class which allows undesired server families to be weeded out, such as based on sizer recommendations. A ServerFamily object 584 encapsulates a server family. An AvailabilityOption object 585 records the availability features in a module, such as redundant fans, NICs, SMP, etc. An SZDataArea object 586 is directed towards sizing data areas. An ArraySz object 587 sizes data areas into drive arrays, a first step in sizing. A DataArea object 588 implements the notion of a data area. A DriveArray object 589 implements the notion of a drive array, such as quantity and drive type, as opposed to data area of a drive.

Figure 28:
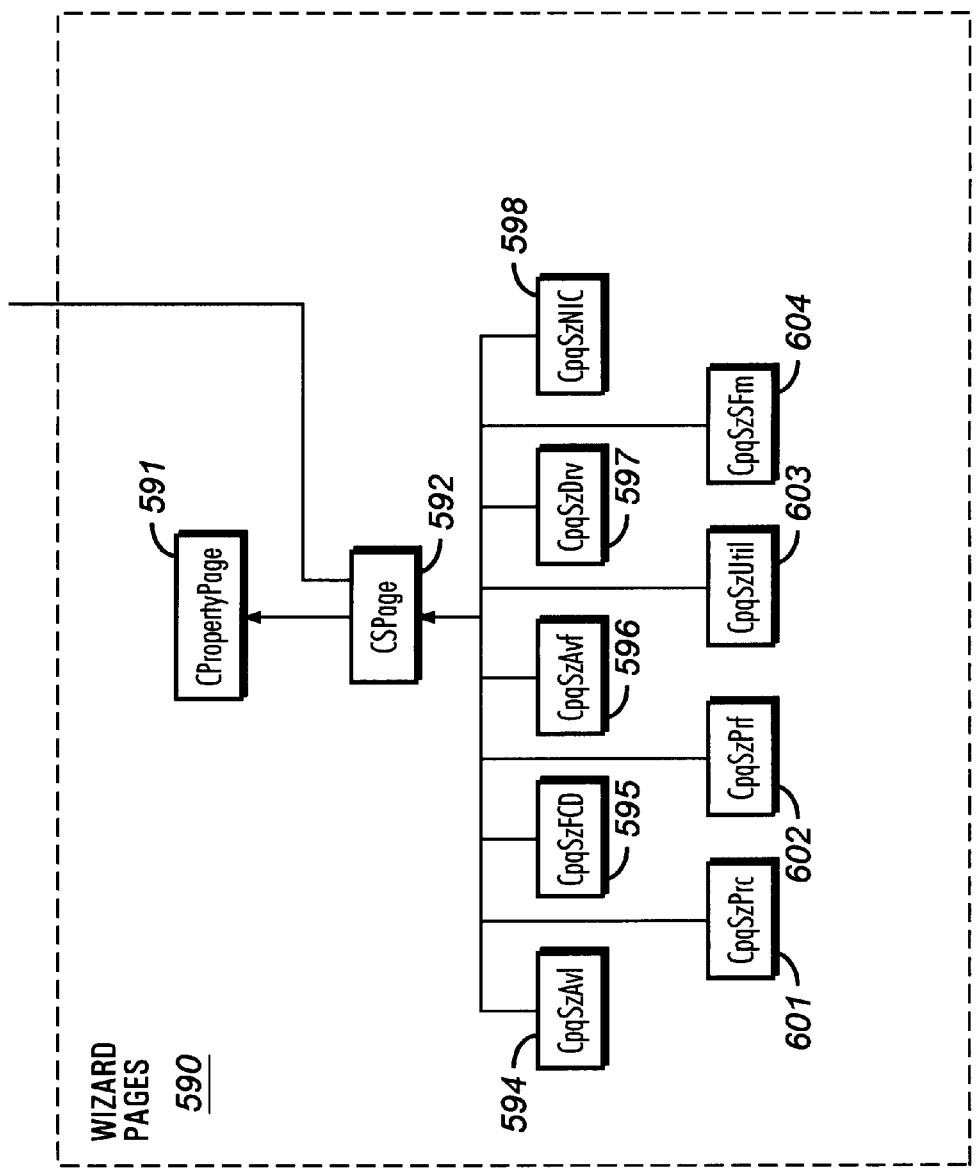

Turning to FIG. 28, illustrated is the Wizard Pages 590, which in general provides certain of the generic screens illustrated in FIGS. 6-21. A CPropertyPage object 591 is a prototype, and a CSPage object 592 is also a prototype. A CpqSzAvl object 594 is a page object for availability level (data critical, business critical, etc.). A CpqSzFCD object 595 is a page object that indicates fiber controller usage. A CpqSzAvf object 596 defines availability features, such as SMP, redundant NICs, etc. A CpqSz)rv object 597 is a page object for drive type selection. A CpqSzNIC object 598 is a page object for NIC selection. A CpqSzPrc object 601 shows price. A CpqSzPrf object 602 is for preferences such as form factor and processor upgrade. A CpqSzUtil object 603 is an object for utilization limits, such as drive, processor, etc. A CpqSzSFm object 604 indicates used server families.

Figure 29:
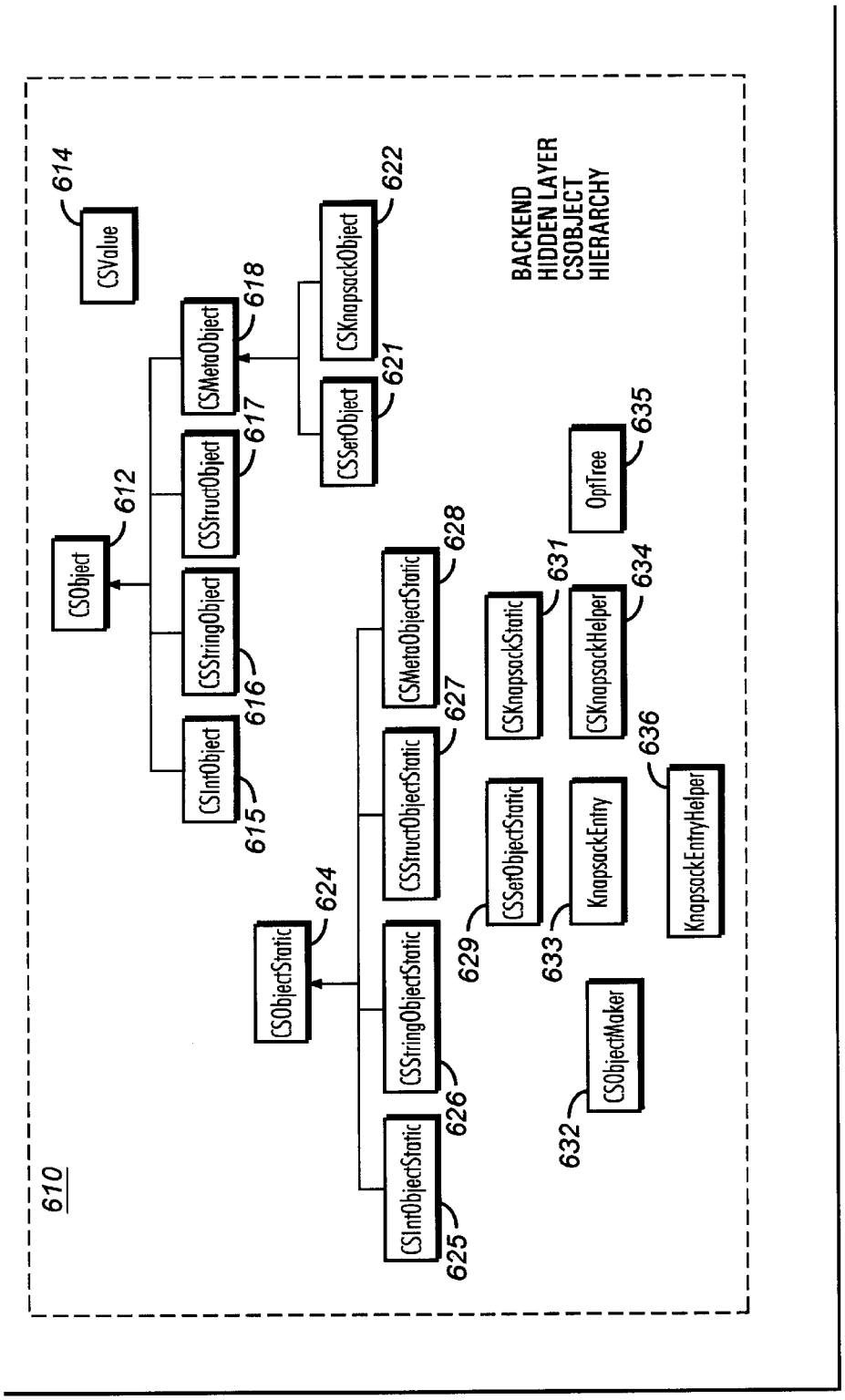

Turning to FIG. 29, the Backend Hidden Layer CSObject Hierarchy 610 is shown. Included is a CSValue object 614 that aids in retrieving the value of an expression, and a CSObject object 612, which is a prototype for various sizer background objects. A CSIntObject object 615 is an interger object, a CSStringObject object 616 is a string object, a CSStructObject object 617 defines structures, and a CSMetaObject object 618 is a sequence of CSObjects. A CSSetObject object 621 is a set of objects, and a CSKnapsackObje object 622 is a knapsack, or an indexible table of sets. For further examples of knapsacks, refer to the source code appendix attached to concurrently filed application entitled "Method of Developing Physical Requirements for Computer Configuration."

A CSObjectStatic object 624 is a set of objects loaded from a hardware description file. A CSlntObjectStatic object 625 is a structure loaded from a hardware description file. A CSStringObjectStatic object 626 is a string object loaded from a hardware description file. A CSMetaObjectStatic object 628 is a sequence of CSOjbects loaded from a hardware description file.

A number of additional CSObjects are available. This includes a CSSetObjectStatic object 629, which is a set of CSObjects loaded from a hardware description file, a CSKnapsackStatic object 631, which is a knapsack loaded from a hardware description file, a CSObjectMaker object 632, which defines the manufacturer. A KnapsackEntry object 633 is a helper class that stores sets within the CSKnapsackObjec object 622. A CSKnapsackHelper object 634 similarly helps with knapsack maintenance. An OptTree object 635 implements indexing within the CSKnapsackStatic object 631. A KnapsackEntryHelper object 636 also assists in storing CSObject sets in an object of the CSKnapsackObjec object 622.

Figure 30:
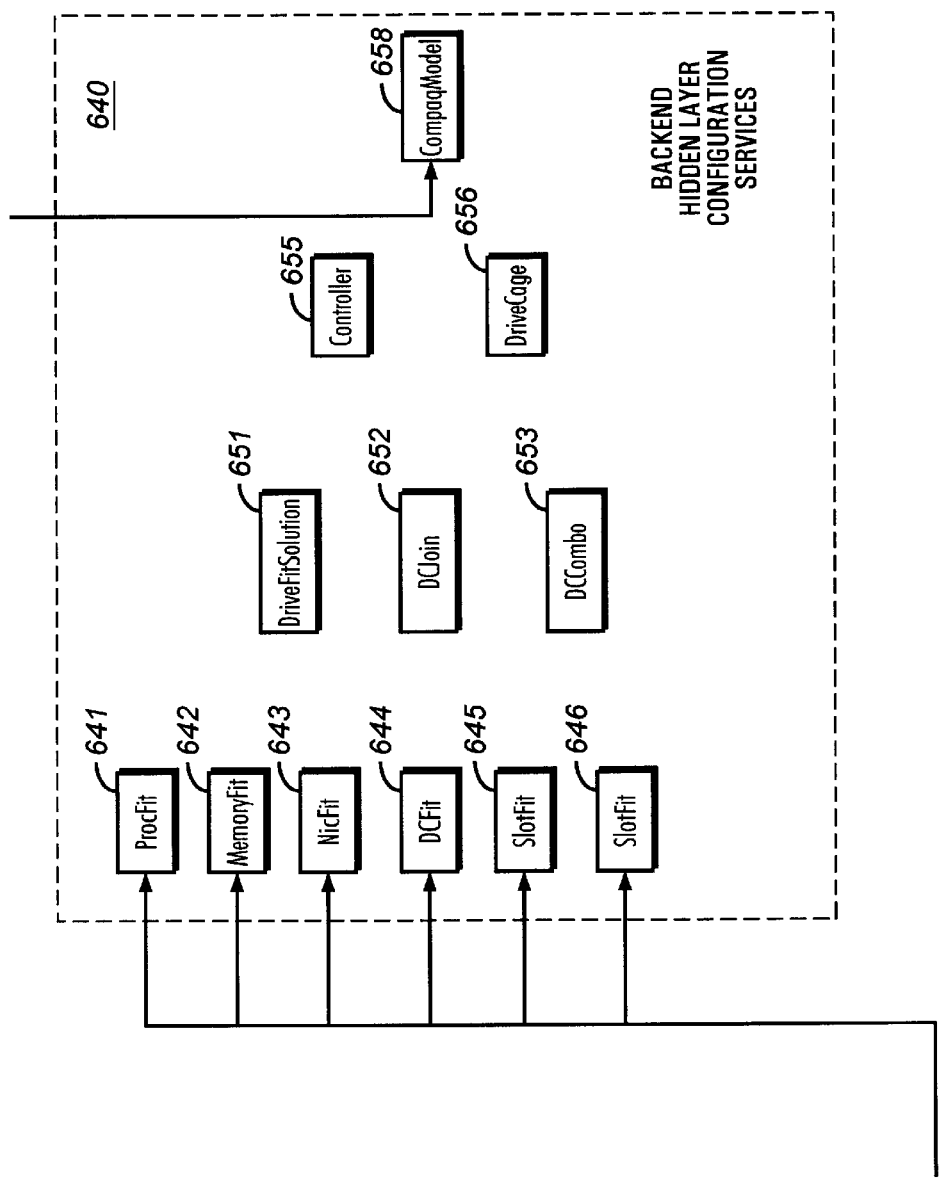

Turning to FIG. 30, illustrated are further configuration services 640. These include a ProcFit object 641, which is a processor configuration engine, a MemoryFit object 642, which is a memory configuration engine, a NicFit object 643, which is a NIC configuration engine, a DCFit object 644, which configures storage systems. A SlotFit object 645 configures PCI slots. A DriveFitSolution object 651 takes a controller/drive cage combination and drive array and fits those into the drive cages. This is further described in previously incorporated application entitled "Method of Developing Physical Requirements for Computer Configuration." A DCJoin object 652 combines sets of controllers with sets of drive cages, where different technology groups are assumed. And a DCCombo object 653 combines sets of controllers with sets of drive cages for every controller with every drive cage possible.

A Controller object 655 represents the controller that hooks up to the drive cages, and a DriveCage object 656 has different drive arrays. A CompaqModel object 658 represents the Compaq model.

All of these objects provide the basis for the sizer framework when used in conjunction with hardware description files.

What is claimed is:

1. A system for selecting configuration of computer components, comprising:
    a general purpose computer for executing application software;
    a configuration sizer framework on the general purpose computer that provides a plurality of architectural classes and a user interface to determine desired system configurations in response to user performance and requirement specifications;
    a configuration sizer on the general purpose computer specific to determine a system configuration for a particular class of computer products, the configuration sizer employing the architectural classes and the user interface of the sizer to determine a desired system configuration of the particular class of computer products;
    wherein the configuration sizer framework contains a list of currently available computer products:
    wherein the configuration sizer framework contains functionality common to a number of sizers; and
    wherein the configuration sizer and configuration sizer framework provide a list of ordered recommended choices of systems based on the performance and requirement specifications entered by the user.

2. The system of claim 1, wherein the configuration sizer is a sizer for determining the system configuration of an SQL server system.

3. The system of claim 1, wherein the interface asks the user a variety of questions concerning performance and requirement specifications.

4. The system of claim 3, wherein the interface asks the user for the user storage requirements.

5. The system of claim 3, wherein the interface asks the user for his logging requirements.

6. The system of claim 3, wherein the interface asks the user to specify a desired level of system availability.

7. The system of claim 6, wherein the level of availability is chosen from one of the following selections: critical data, business critical, and 7×24.

8. The system of claim 3, wherein the interface asks the user for a desired physical configuration.

9. The system of claim 3, wherein the interface asks the user's desired level of upgradeability.

10. The system of claim 3, wherein the interface asks the user to enter utilization thresholds.

11. The system of claim 1, wherein the configuration sizer and configuration sizer framework specify recommended families of components for further evaluation.

12. The system of claim 11, wherein the configuration sizer and configuration sizer framework specify families of servers.

13. The system of claim 11, wherein the configuration sizer and configuration sizer framework specify families of mass storage devices.

14. Computer executable code stored on machine readable media for selecting configurations of computer components, the computer executable code comprising:
    a configuration sizer framework on the general purpose computer that provides a plurality of architectural classes and a user interface to determine desired system configurations in response to user performance and requirement specifications;
    a configuration sizer on the general purpose computer specific to determine a system configuration for a particular class of computer products, the configuration sizer employing the architectural classes and the user interface of the sizer to determine a desired system configuration of the particular class of computer products;
    wherein the configuration sizer framework contains a list of currently available computer products;
    wherein the configuration sizer framework contains functionality common to a number of sizers; and
    wherein the configuration sizer and configuration sizer framework provide a list of ordered recommended choices of systems based on the performance and requirement specifications entered by the user.

15. The computer executable code of claim 14, wherein the configuration sizer is a sizer for determining the system configuration of an SQL server system.

16. The computer executable code of claim 14, wherein the interface asks the user a variety of questions concerning performance and requirement specifications.

17. The computer executable code of claim 16, wherein the interface asks the user for the user storage requirements.

18. The computer executable code of claim 16, wherein the interface asks the user for his logging requirements.

19. The computer executable code of claim 16, wherein the interface asks the user to specify a desired level of system availability.

20. The computer executable code of claim 19, wherein the level of availability is chosen from one of the following selections: critical data, business critical, and 7×24.

21. The computer executable code of claim 16, wherein the interface asks the user for a desired physical configuration.

22. The computer executable code of claim 16, wherein the interface asks the user for a desired level of upgradeability.

23. The computer executable code of claim 16, wherein the interface asks the user to enter utilization thresholds.

24. The computer executable code of claim 14, wherein the configuration sizer and configuration sizer framework specify recommended families of components for further evaluation.

25. The computer executable code of claim 24, wherein the configuration sizer and configuration sizer framework specify families of servers.

26. The computer executable code of claim 24, wherein the configuration sizer and configuration sizer framework specify families of mass storage.

27. The computer executable code of claim 14, wherein the configuration sizer and configuration sizer framework provide a list of ordered recommended choices of systems based on the performance and requirement specifications entered by the user.

28. A method of developing a configuration selection system for a class of products, comprising the steps of:

providing a framework of user interface and architectural classes to determine desired system configurations in response to a user's performance and requirement specifications;

developing a configuration sizer for a particular class of product that employs the architectural classes and user interface of the framework;

employing the configuration sizer and the framework to select particular components for a particular class of product that match a user's performance and requirement specifications;

wherein the framework contains a list of currently available computer products;

wherein the framework contains functionality common to a number of sizers; and wherein the configuration sizer and the framework provide a list of ordered recommended choices of systems based on the performance and requirement specifications entered by the user.

* * * * *

UNITED STATES PATENT AND TRADEMARK OFFICE
CERTIFICATE OF CORRECTION

PATENT NO. : 6,263,382 B1
DATED : July 17, 2001
INVENTOR(S) : Charles A. Bartlett et al.

It is certified that error appears in the above-identified patent and that said Letters Patent is hereby corrected as shown below:

Column 19,
Line 55, delete "products:" and insert therefor -- products; --.

Signed and Sealed this

First Day of November, 2005

JON W. DUDAS
*Director of the United States Patent and Trademark Office*